(12) United States Patent
Kurokawa

(10) Patent No.: US 10,650,757 B2
(45) Date of Patent: May 12, 2020

(54) DISPLAY DEVICE

(71) Applicant: Japan Display Inc., Minato-ku (JP)

(72) Inventor: Tae Kurokawa, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 39 days.

(21) Appl. No.: 15/966,251

(22) Filed: Apr. 30, 2018

(65) Prior Publication Data

US 2018/0330681 A1  Nov. 15, 2018

(30) Foreign Application Priority Data

May 12, 2017  (JP) ................................ 2017-095987

(51) Int. Cl.
*G09G 3/36* (2006.01)
*G02F 1/1339* (2006.01)
(Continued)

(52) U.S. Cl.
CPC ......... *G09G 3/3607* (2013.01); *G02B 6/0076* (2013.01); *G02B 6/0083* (2013.01); *G02F 1/1334* (2013.01); *G02F 1/1339* (2013.01); *G02F 1/1368* (2013.01); *G02F 1/13318* (2013.01); *G02F 1/133615* (2013.01); *G02B 6/0068* (2013.01); *G02F 2001/133622* (2013.01); *G02F 2201/58* (2013.01); *G02F 2203/01* (2013.01); *G02F 2203/34* (2013.01);
(Continued)

(58) Field of Classification Search
CPC .......... G09G 3/3607; G09G 2320/064; G09G 2360/144; G09G 2360/16; G09G 2310/0235; G09G 2320/0271; G02B 6/0076; G02B 6/0083; G02F 1/13318; G02F 1/1334; G02F 1/1339; G02F 1/1368

See application file for complete search history.

(56) References Cited

U.S. PATENT DOCUMENTS

2008/0165292 A1\* 7/2008 Bing ................... H04N 9/3182
348/744
2011/0141159 A1 6/2011 Takeuchi
(Continued)

FOREIGN PATENT DOCUMENTS

| JP | 2007232882 A \* | 9/2007 |
|---|---|---|
| JP | 2011-128256 | 6/2011 |
| JP | 2016-85452 | 5/2016 |

*Primary Examiner* — Robert J Michaud
(74) *Attorney, Agent, or Firm* — Oblon, McClelland, Maier & Neustadt, L.L.P.

(57) ABSTRACT

According to an aspect, a display device includes: a first translucent substrate; a second translucent substrate facing the first translucent substrate; a liquid crystal layer including polymer dispersed liquid crystal sealed between the first and second translucent substrates; at least one light emitter facing at least one of side surfaces of the first and the second translucent substrates; and a display controller. The display controller includes: an external light analyzer setting, in accordance with a received signal of external light information, a second color gamut different from a first color gamut displayable when the external light is not present; and a signal adjuster converting in color a first pixel input signal into a second pixel input signal that reduces a color shift of a second reproduced color in the second color gamut from a first reproduced color in the first color gamut in accordance with the first pixel input signal.

14 Claims, 21 Drawing Sheets

(51) Int. Cl.
  *G02F 1/133* (2006.01)
  *G02F 1/1368* (2006.01)
  *F21V 8/00* (2006.01)
  *G02F 1/13357* (2006.01)
  *G02F 1/1334* (2006.01)

(52) U.S. Cl.
  CPC ............... *G09G 2310/0235* (2013.01); *G09G 2320/0271* (2013.01); *G09G 2320/064* (2013.01); *G09G 2320/0666* (2013.01); *G09G 2360/144* (2013.01); *G09G 2360/16* (2013.01)

(56) References Cited

U.S. PATENT DOCUMENTS

| | | | |
|---|---|---|---|
| 2011/0149201 A1* | 6/2011 | Powell | G02F 1/133615 349/62 |
| 2016/0116768 A1 | 4/2016 | Okuyama et al. | |
| 2017/0352329 A1 | 12/2017 | Imai | |
| 2018/0211610 A1 | 7/2018 | Kato | |
| 2018/0293947 A1 | 10/2018 | Kurokawa et al. | |

* cited by examiner

| | x | y |
|---|---|---|
| RED | 0.640 | 0.330 |
| GREEN | 0.300 | 0.600 |
| BLUE | 0.150 | 0.060 |
| WHITE | 0.313 | 0.329 |

Tcg1

⇒

| | x | y |
|---|---|---|
| RED | 0.443 | 0.322 |
| GREEN | 0.304 | 0.474 |
| BLUE | 0.221 | 0.173 |
| WHITE | 0.312 | 0.326 |

Tcg2

DISPLAY DEVICE

CROSS-REFERENCE TO RELATED APPLICATIONS

This application claims priority from Japanese Application No. 2017-095987, filed on May 12, 2017, the contents of which are incorporated by reference herein in its entirety.

BACKGROUND

1. Technical Field

The present disclosure relates to a display device.

2. Description of the Related Art

Japanese Patent Application Laid-open Publication No. 2016-085452 describes a display device including a light modulation layer and a light source. The light modulation layer is disposed between a pair of transparent substrates and includes a plurality of light modulation devices that have predetermined refractive index anisotropy and that are different in responsiveness to an electric field generated by electrodes provided on the transparent substrates. The light source emits light of a predetermined color into the light modulation layer from a side surface of the light modulation layer. The light modulation layer transmits the incident light received from the light source when the electric field is not generated, and scatters the incident light and emits the scattered light to the transparent substrates when the electric field is generated.

SUMMARY

According to an aspect, a display device includes: a first translucent substrate; a second translucent substrate facing the first translucent substrate; a liquid crystal layer including polymer dispersed liquid crystal sealed between the first translucent substrate and the second translucent substrate; at least one light emitter facing at least one of a side surface of the first translucent substrate or a side surface of the second translucent substrate; and a display controller including: an external light analyzer configured to set, in accordance with a received signal of external light information, a second color gamut different from a first color gamut displayable when the external light is not present; and a signal adjuster configured to convert in color a first pixel input signal into a second pixel input signal that reduces a color shift of a second reproduced color reproduced in the second color gamut from a first reproduced color reproduced in the first color gamut in accordance with the first pixel input signal.

According to another aspect, a display device includes: a first translucent substrate; a second translucent substrate facing the first translucent substrate; a liquid crystal layer including polymer dispersed liquid crystal sealed between the first translucent substrate and the second translucent substrate; at least one light emitter facing at least one of a side surface of the first translucent substrate or a side surface of the second translucent substrate; a display controller including: an external light analyzer configured to set, in accordance with a received signal of external light information, a second color gamut different from a first color gamut displayable when the external light is not present; and a signal adjuster configured to convert in color a first pixel input signal into a second pixel input signal that reduces a color shift of a second reproduced color reproduced in the second color gamut from a first reproduced color reproduced in the first color gamut in accordance with the first pixel input signal; and a first electrode and a second electrode interposing the liquid crystal layer therebetween. The light emitter is configured to sequentially emit light of a first color, light of a second color, and light of a third color based on a light emitter control value using a field-sequential system. The display controller is configured to: compare a gradation value of the first color, a gradation value of the second color, and a gradation value of the third color in the first pixel input signal with a gradation value of the first color, a gradation value of the second color, and a gradation value of the third color in the second pixel input signal on a color-by-color basis, and calculate, based on a higher gradation value of each of the colors, a gradation value of the first color, a gradation value of the second color, and a gradation value of the third color for a third pixel input signal; sequentially apply a voltage to the first electrode according to the gradation value of the first color, the gradation value of the second color, and the gradation value of the third color of the third pixel input signal; and set the light emitter control value for a color having the same gradation value as that of the first pixel input signal among the gradation value of the first color, the gradation value of the second color, and the gradation value of the third color of the third pixel input signal to a value lower than the light emitter control value for a color having the same gradation value as that of the second pixel input signal among the gradation value of the first color, the gradation value of the second color, and the gradation value of the third color of the third pixel input signal.

DETAILED DESCRIPTION

Figure 1:
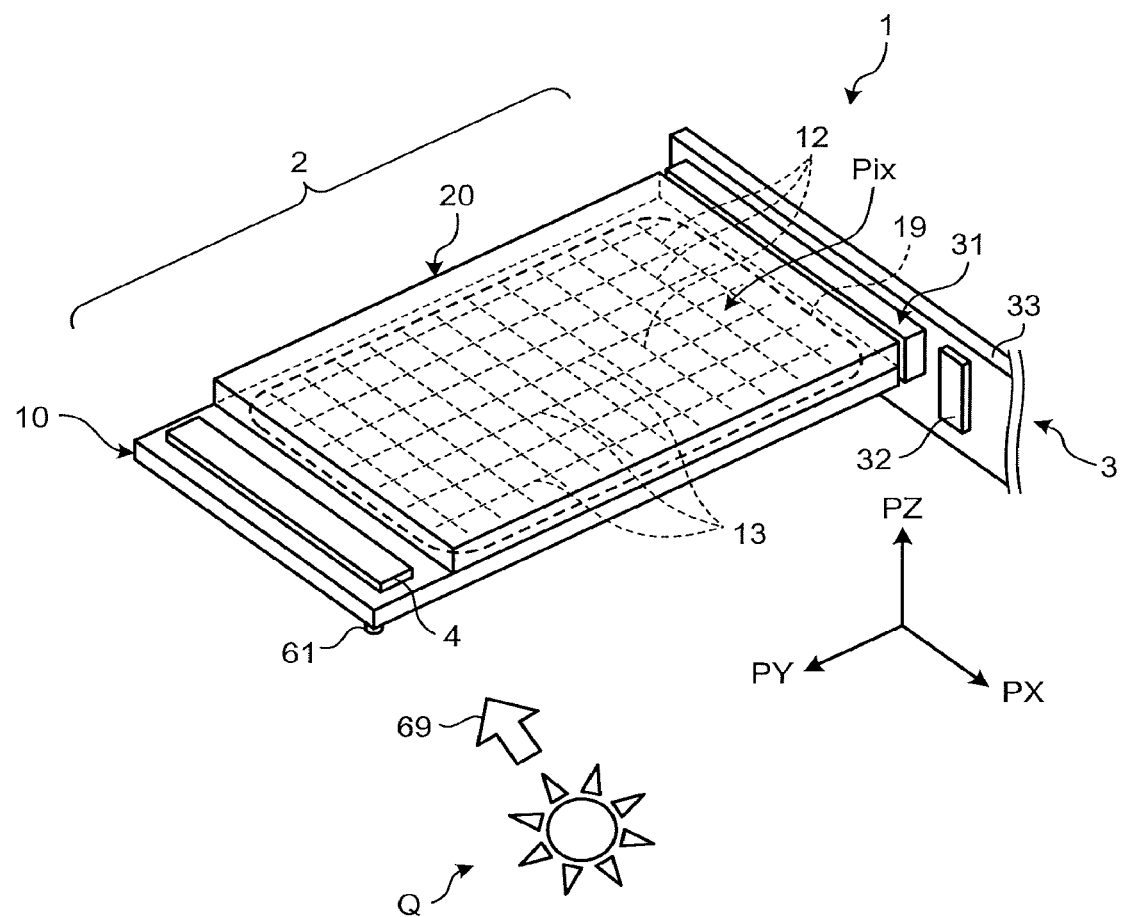
FIG. 1 is a perspective view illustrating an example of a display device according to an embodiment of the present disclosure.

Exemplary aspects (embodiments) according to the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below can be appropriately combined. The disclosure is given by way of example only, and various changes made without departing from the spirit of the disclosure and easily conceivable by those skilled in the art are naturally included in the scope of the invention. The drawings may possibly illustrate the width, the thickness, the shape, and the like of each unit more schematically than the actual aspect to simplify the explanation. These elements, however, are given by way of example only and are not intended to limit interpretation of the disclosure. In the specification and the figures, components similar to those previously described with reference to a preceding figure are denoted by like reference numerals, and detailed explanation thereof will be appropriately omitted. In this disclosure, when an element A is described as being "on" another element B, the element A can be directly on the other element B, or there can be one or more elements between the element A and the other element B.

Figure 2:
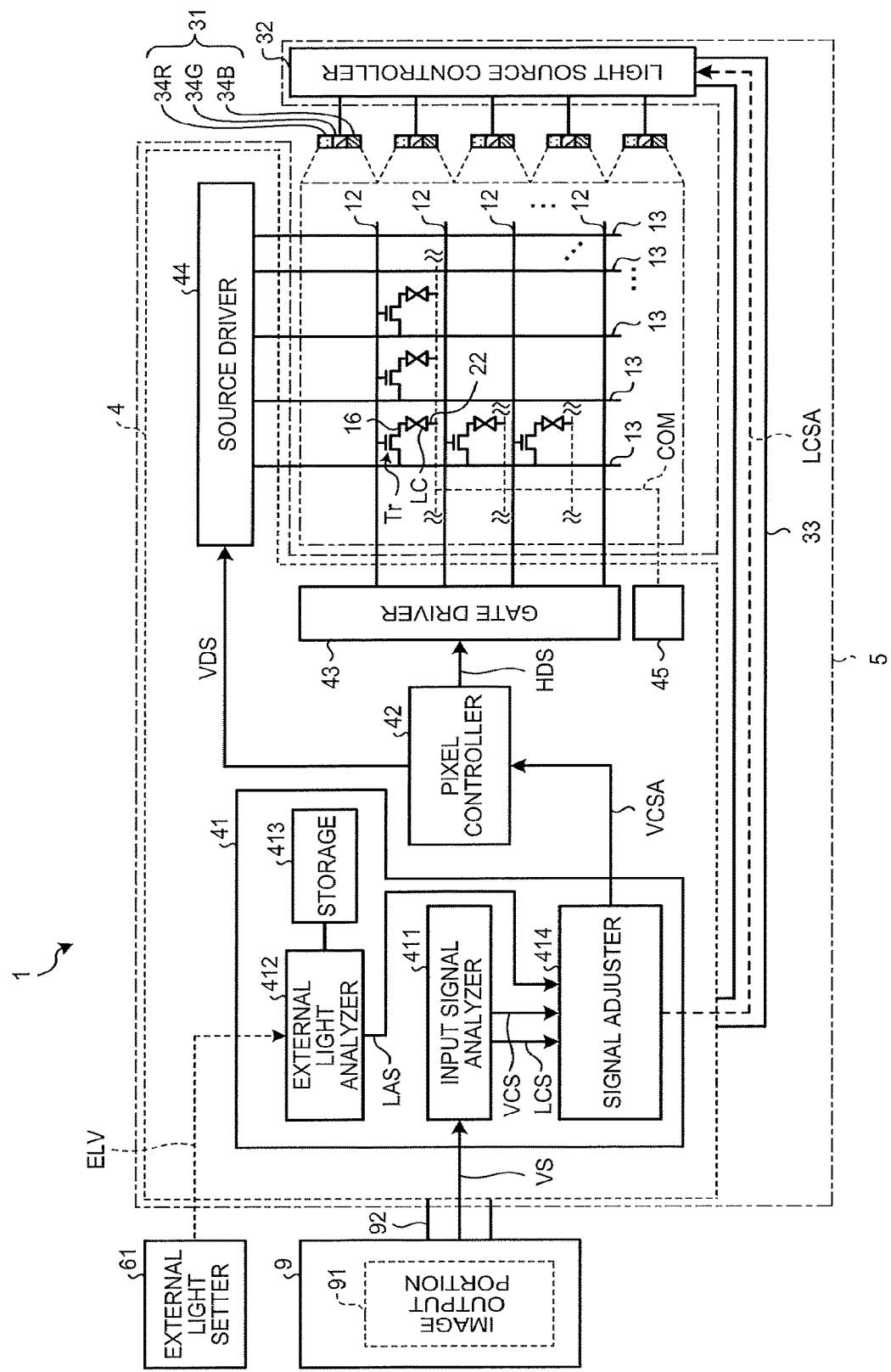
FIG. 2 is a block diagram illustrating the display device of FIG. 1.
Figure 3:
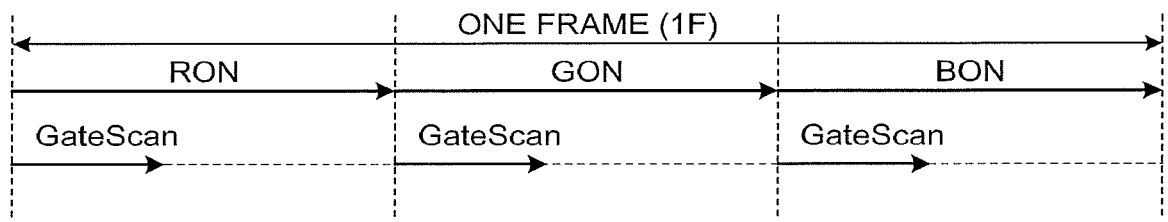
FIG. 3 is a timing diagram for explaining timing of light emission by a light source in a field-sequential system.

FIG. 1 is a perspective view illustrating an example of a display device according to the present embodiment. FIG. 2 is a block diagram illustrating the display device of FIG. 1. FIG. 3 is a timing diagram for explaining timing of light emission by a light source in a field-sequential system.

As illustrated in FIG. 1, a display device 1 includes a display panel 2, a side light source 3, a drive circuit 4 constituting a part of a display controller 5 (refer to FIG. 2) to be described later, and an external light setter 61. A PX direction denotes one direction of the display panel 2. A PY direction denotes a direction orthogonal to the PX direction. A PZ direction denotes a direction orthogonal to a PX-PY plane.

Figure 5:
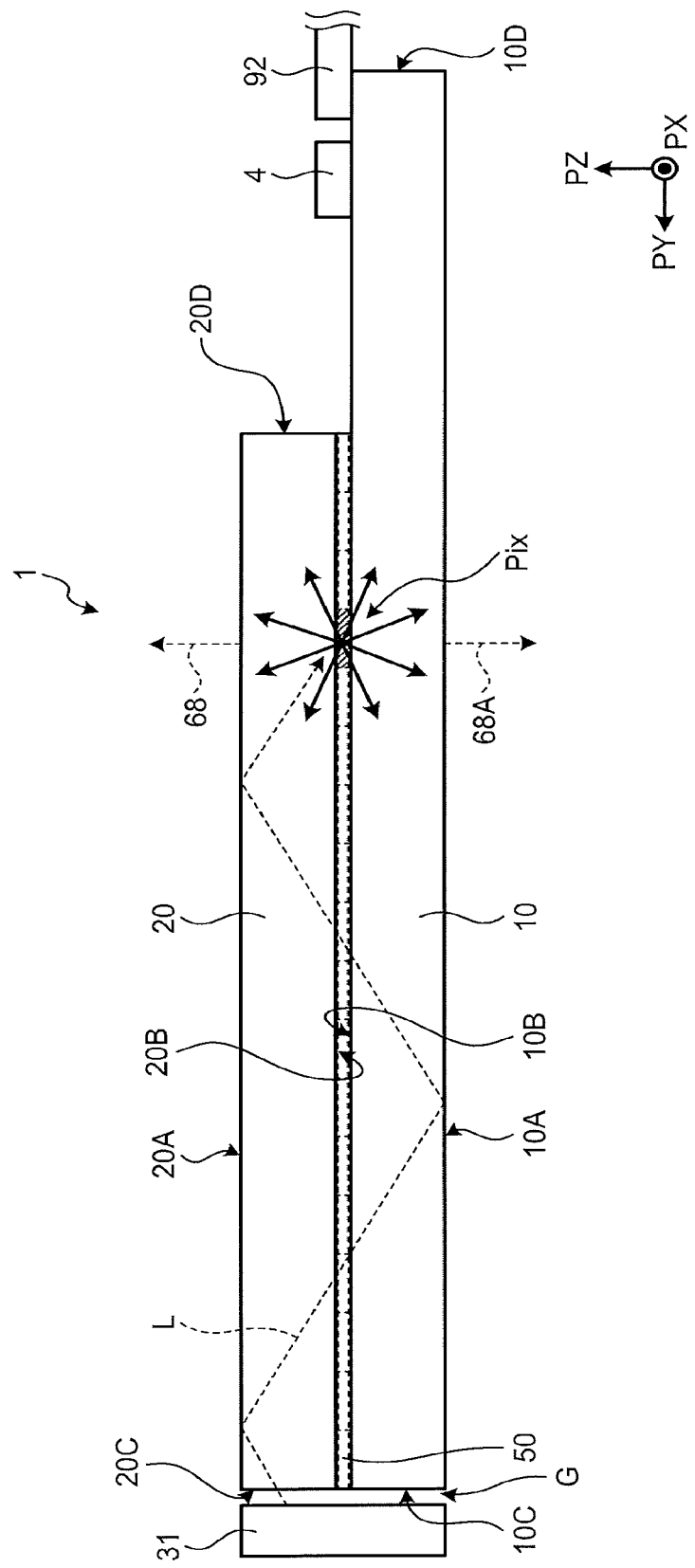
FIG. 5 is a sectional view illustrating an exemplary section of the display device of FIG. 1.

The display panel 2 includes a first translucent substrate 10, a second translucent substrate 20, and a liquid crystal layer 50 (refer to FIG. 5). The second translucent substrate 20 faces a surface of the first translucent substrate 10 in a direction orthogonal thereto (in the PZ direction in FIG. 1). Polymer dispersed liquid crystal (to be described later) is sealed in the liquid crystal layer 50 (refer to FIG. 5) with the first translucent substrate 10, the second translucent substrate 20, and a sealing part 19.

As illustrated in FIG. 1, the inside of the sealing part 19 in the display panel 2 serves as a display region. A plurality of pixels Pix are arranged in a matrix in the display region. In the present disclosure, a row refers to a pixel row including m pixels Pix arranged in one direction, and a column refers to a pixel column including n pixels Pix arranged in a direction orthogonal to the direction in which the rows are arranged. The values of m and n are determined according to a display resolution in the vertical direction and a display resolution in the horizontal direction. A plurality of scanning lines 12 are arranged row by row, and a plurality of signal lines 13 are arranged column by column.

The side light source 3 includes a light emitter 31. As illustrated in FIG. 2, a light source controller 32, a light source substrate 33 provided with the light emitter 31 and the light source controller 32, and the drive circuit 4 constitute the display controller 5. The light source substrate 33 is a flexible substrate, and serves also as wiring for electrically coupling the light source controller 32 to the drive circuit 4 (refer to FIG. 2). The light emitter 31 is electrically coupled to the light source controller 32 through the wiring in the light source substrate 33.

The external light setter 61 is, for example, a visible light sensor. The visible light sensor detects external light 69 from an external light source Q, and generates information on tristimulus values (X,Y,Z) obtained by spectrally splitting the external light 69 according to the wavelength thereof as a signal ELV of the external light information. The external light setter 61 transmits the generated signal ELV of the external light information to the drive circuit 4. The external light setter 61 is fixed to a surface of the first translucent substrate 10. The external light setter 61 may be fixed to any positions as long as it can detect the external light 69 around the display panel 2.

The external light setter 61 is not limited to the visible light sensor, but may be, for example, a setting switch for the external light. The setting switch for the external light generates the signal ELV of the external light information based on a set value of the external light information set in advance by a viewer according to visible light of the external light 69. For example, the setting switch for the external light has predetermined external light tristimulus values (X',Y',Z') serving as the external light information for each of environmental modes, such as a sunlight clear sky mode (first environment mode), a sunlight cloudy sky mode (second environment mode), an indoor use mode (third environment mode), and a night-time use mode (fourth environment mode). The external light setter 61 transmits the generated signal ELV of the external light information to the drive circuit 4. If the external light setter 61 is the setting switch for the external light, the setting switch for the external light may be fixed at any positions as longs as it can transmit the signal ELV of the external light information to the drive circuit 4.

As illustrated in FIG. 1, the drive circuit 4 is fixed to the surface of the first translucent substrate 10. As illustrated in FIG. 2, the drive circuit 4 includes an analyzer 41, a pixel controller 42, a gate driver 43, a source driver 44, and a common potential driver 45. The first translucent substrate 10 has an area larger than that of the second translucent substrate 20 in the X-Y plane, and the drive circuit 4 is provided on an overhanging portion of the first translucent substrate 10 exposed from the second translucent substrate 20.

The analyzer 41 receives an input signal (e.g., a red-green-blue (RGB) signal) VS from an image output portion 91 of an external higher-level controller 9 through a flexible substrate 92.

The analyzer 41 includes an input signal analyzer 411, an external light analyzer 412, a storage 413, and a signal adjuster 414. The input signal analyzer 411 generates a first pixel input signal VCS and a light source control signal LCS in accordance with an input signal VS input from the outside. The light source control signal LCS is a signal including information on a light quantity of the light emitter 31 set according to, for example, input gradation values given to all the pixels Pix. For example, the light quantity of the light emitter 31 is set smaller when a darker image is displayed, and set larger when a brighter image is displayed.

The first pixel input signal VCS is a signal for determining a gradation value to be given to each of the pixels Pix of the display panel 2 in accordance with the input signal VS. In other words, the first pixel input signal VCS is a signal including gradation information on the gradation value of each of the pixels Pix. The pixel controller 42 sets an output gradation value by performing correction processing, such as gamma correction and expansion processing, on each of the input gradation values of the first pixel input signal VCS.

The external light analyzer 412 receives the signal ELV of the external light information from the external light setter 61 described above. The external light analyzer 412 generates an adjustment signal LAS according to the signal ELV of the external light information based on a look-up table stored in the storage 413. The external light analyzer 412 sets a second color gamut Cg2 (refer to FIG. 14) to be described later, and then generates the adjustment signal LAS including information on a color conversion matrix M (to be described later) according to the second color gamut Cg2.

In a first control mode, the signal adjuster 414 generates a light source control signal LCSA directly from the light source control signal LCS without adjusting it using the adjustment signal LAS, and transmits the light source control signal LCSA to the light source controller 32. The signal adjuster 414 then transmits a second pixel input signal VCSA generated from the first pixel input signal VCS to the pixel controller 42. In a second control mode, the signal adjuster 414 generates the second pixel input signal VCSA from the first pixel input signal VCS according to the adjustment signal LAS, and transmits the second pixel input signal VCSA to the pixel controller 42. The signal adjuster 414 then generates the light source control signal LCSA from the light source control signal LCS according to the adjustment signal LAS, and transmits the light source control signal LCSA to the light source controller 32. The first control mode and the second control mode are switched, for example, by a control signal from the higher-level controller 9. The signal adjuster 414 may operate only in the first control mode, or only in the second control mode.

The pixel controller 42 generates a horizontal drive signal HDS and a vertical drive signal VDS in accordance with the second pixel input signal VCS. In the present embodiment, since the display device 1 is driven by the field-sequential system, the horizontal drive signal HDS and the vertical drive signal VDS are generated for each color emittable by the light emitter 31.

The gate driver 43 sequentially selects the scanning lines 12 of the display panel 2 in accordance with the horizontal drive signal HDS during one vertical scanning period. The scanning lines 12 can be selected in any order.

The source driver 44 supplies a gradation signal according to the output gradation value of each of the pixels Pix to corresponding one of the signal lines 13 of the display panel 2 in accordance with the vertical drive signal VDS during one horizontal scanning period.

In the present embodiment, the display panel 2 is an active-matrix panel. For this reason, the display panel 2 includes the signal (source) lines 13 extending in the PY direction and the scanning (gate) lines 12 extending in the PX direction in a plan view, and includes switching elements Tr at intersections between the signal lines 13 and the scanning lines 12.

A thin-film transistor is used as each of the switching elements Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to each of the signal lines 13, and the gate electrode of the switching element Tr is coupled to each of the scanning lines 12. The other of the source electrode and the drain electrode is coupled to one end of a liquid crystal capacitor LC. The liquid crystal capacitor LC is coupled at one end thereof to the switching element Tr through a pixel electrode 16, and coupled at the other end thereof to a common potential COM through a common electrode 22. The common potential COM is supplied from the common potential driver 45.

The light emitter 31 includes a light emitter 34R of a first color (e.g., red), a light emitter 34G of a second color (e.g., green), and a light emitter 34B of a third color (e.g., blue). The light source controller 32 controls the light emitter 34R of the first color, the light emitter 34G of the second color, and the light emitter 34B of the third color to emit light in a time-division manner in accordance with the light source control signal LCSA. In this manner, the light emitter 34R of the first color, the light emitter 34G of the second color, and the light emitter 34B of the third color are driven by the field-sequential system.

As illustrated in FIG. 3, during a first sub-frame (first predetermined time) RON, the light emitter 34R of the first color emits light, and the pixels Pix selected during one vertical scanning period GateScan scatter light to perform display. At this time, on the entire display panel 2, if the above-described gradation signal according to the output gradation value of each of the pixels Pix selected during this vertical scanning period GateScan is supplied to corresponding one of the signal lines 13, only the first color is lit up.

Subsequently, during a second sub-frame (second predetermined time) GON, the light emitter 34G of the second color emits light, and the pixels Pix selected during one vertical scanning period GateScan scatter light to perform display. At this time, on the entire display panel 2, if the above-described gradation signal according to the output gradation value of each of the pixels Pix selected during this vertical scanning period GateScan is supplied to corresponding one of the signal lines 13, only the second color is lit up.

Further, during a third sub-frame (third predetermined time) BON, the light emitter 34B of the third color emits light, and the pixels Pix selected during one vertical scanning period GateScan scatter light to perform display. At this time, on the entire display panel 2, if the above-described gradation signal according to the output gradation value of each of the pixels Pix selected during this vertical scanning period GateScan is supplied to corresponding one of the signal lines 13, only the third color is lit up.

The eyes of a human have a limited temporal resolution, and see an afterimage. Thus, the eyes of a human recognize a synthesized image of three colors in a period of one frame (1F). The field-sequential system requires no color filter, and suppresses an absorption loss in color filters, which can achieve higher transmittance. In a color filter system, one pixel is made of sub-pixels obtained by dividing each of the pixels Pix into sub-pixels of the first color, the second color, and the third color. On the other hand, the field sequential system does not require such division into sub-pixels, and thus can easily increase the resolution.

Figure 4:
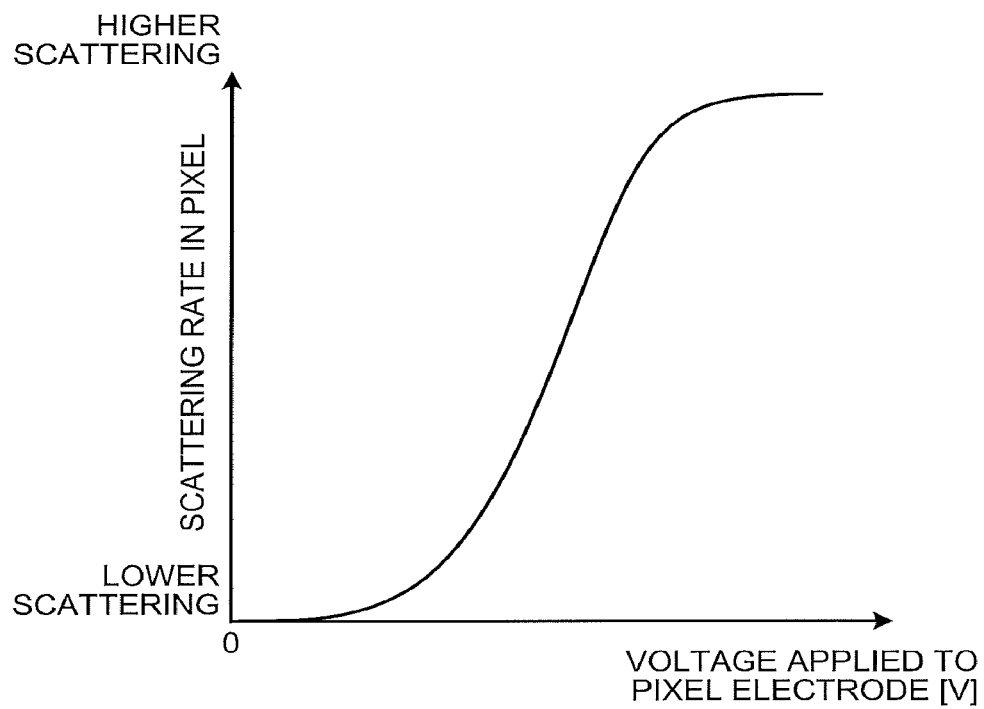
FIG. 4 is a diagram for explaining a relation between a voltage applied to a pixel electrode and a scattering state of a pixel.
Figure 6:
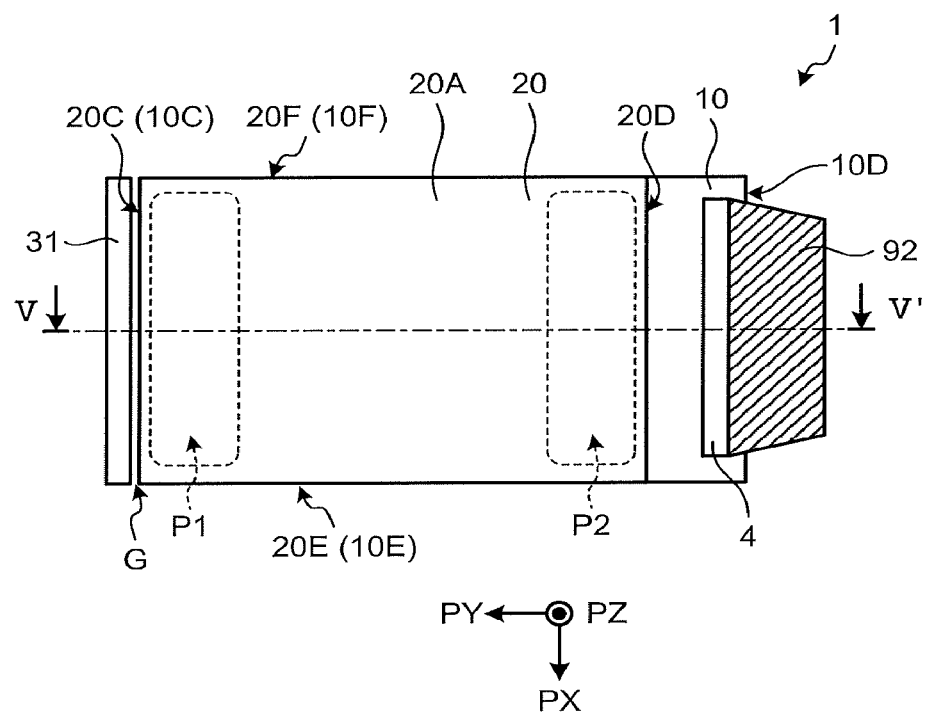
FIG. 6 is a plan view illustrating a plane of the display device of FIG. 1.
Figure 7:
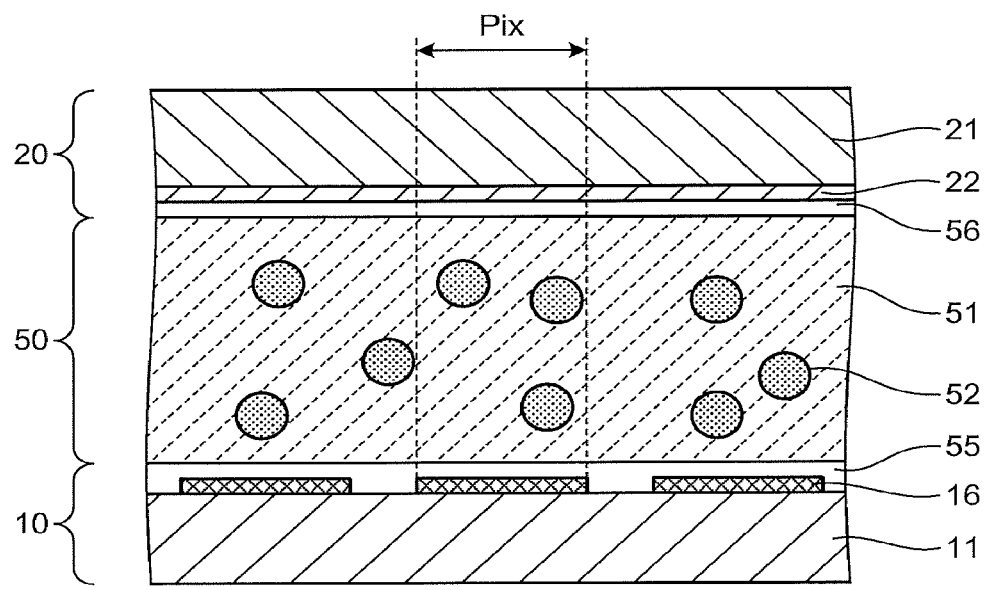
FIG. 7 is an enlarged sectional view obtained by enlarging a liquid crystal layer portion of FIG. 5.
Figure 8:
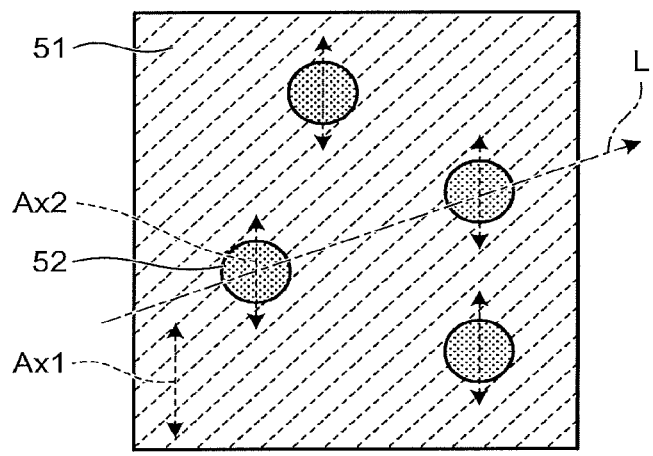
FIG. 8 is a sectional view for explaining a non-scattering state in the liquid crystal layer.
Figure 9:
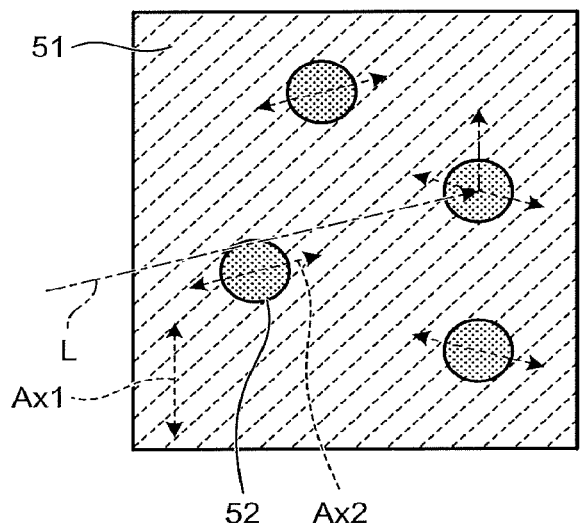
FIG. 9 is a sectional view for explaining the scattering state in the liquid crystal layer.

FIG. 4 is a diagram for explaining a relation between a voltage applied to the pixel electrode and a scattering state of the pixel. FIG. 5 is a sectional view illustrating an exemplary section of the display device of FIG. 1. FIG. 6 is a plan view illustrating a plane of the display device of FIG. 1. FIG. 5 illustrates a V-V' section of FIG. 6. FIG. 7 is an enlarged sectional view obtained by enlarging the liquid crystal layer portion of FIG. 5. FIG. 8 is a sectional view for explaining a non-scattering state in the liquid crystal layer. FIG. 9 is a sectional view for explaining the scattering state in the liquid crystal layer.

If the gradation signal according to the output gradation value of each of the pixels Pix selected during one vertical scanning period GateScan is supplied to each of the above-described signal lines 13, the voltage applied to the pixel electrode 16 changes with the gradation signal. The change in the voltage applied to the pixel electrode 16 changes the voltage between the pixel electrode 16 and the common electrode 22. The scattering state of the liquid crystal layer 50 for each of the pixels Pix is controlled according to the voltage applied to the pixel electrode 16, and the scattering rate in the pixel Pix changes, as illustrated in FIG. 4.

As illustrated in FIGS. 5 and 6, the first translucent substrate 10 has a first principal surface 10A, a second principal surface 10B, a first side surface 10C, a second side surface 10D, a third side surface 10E, and a fourth side surface 10F. The first principal surface 10A and the second principal surface 10B are planes parallel to each other. The first side surface 10C and the second side surface 10D are planes parallel to each other. The third side surface 10E and the fourth side surface 1OF are planes parallel to each other.

As illustrated in FIGS. 5 and 6, the second translucent substrate 20 has a first principal surface 20A, a second principal surface 20B, a first side surface 20C, a second side surface 20D, a third side surface 20E, and a fourth side surface 20F. The first principal surface 20A and the second principal surface 20B are planes parallel to each other. The first side surface 20C and the second side surface 20D are planes parallel to each other. The third side surface 20E and the fourth side surface 20F are planes parallel to each other.

As illustrated in FIGS. 5 and 6, the light emitter 31 faces the first side surface 20C of the second translucent substrate 20. As illustrated in FIG. 5, the light emitter 31 emits light-source light L to the first side surface 20C of the second translucent substrate 20. The first side surface 20C of the second translucent substrate 20 facing the light emitter 31 serves as a light incident surface. A gap G is provided between the light emitter 31 and the light incident surface. The gap G forms an air layer.

As illustrated in FIG. 5, the light-source light L emitted from the light emitter 31 propagates in a direction away from the first side surface 20C while being reflected by the first principal surface 10A of the first translucent substrate 10 and the first principal surface 20A of the second translucent substrate 20. When the light-source light L travels from the first principal surface 10A of the first translucent substrate 10 or the first principal surface 20A of the second translucent substrate 20 to the outside, the light-source light L enters a medium having a lower refractive index from a medium having a higher refractive index. Hence, if the incident angle of the light-source light L incident on the first principal surface 10A of the first translucent substrate 10 or the first principal surface 20A of the second translucent substrate 20 is larger than a critical angle, the light-source light L is fully reflected by the first principal surface 10A of the first translucent substrate 10 or the first principal surface 20A of the second translucent substrate 20.

As illustrated in FIG. 5, the light-source light L that has propagated through the inside of the first translucent substrate 10 and that of the second translucent substrate 20 is scattered by any of the pixels Pix including liquid crystal in the scattering state, and the incident angle of the scattered light becomes an angle smaller than the critical angle. Thus, emission light 68 is emitted outward from the first principal surface 20A of the second translucent substrate 20, and emission light 68A is emitted outward from the first principal surface 10A of the first translucent substrate 10 or the first principal surface 20A of the second translucent substrate 20. The emission light 68 emitted outward from the first principal surface 20A of the second translucent substrate 20 or the emission light 68A emitted outward from the first principal surface 10A of the first translucent substrate 10 is viewed by the viewer. In the present disclosure, a value representing a level of luminance of the emission light 68 or the emission light 68A in the pixel Pix is called an emission luminance gradation value. The following describes the polymer dispersed liquid crystal in the scattering state and the polymer dispersed liquid crystal in the non-scattering state, using FIGS. 7 to 9.

As illustrated in FIG. 7, the first translucent substrate 10 is provided with a first orientation film 55, and the second translucent substrate 20 is provided with a second orientation film 56. The first and the second orientation films 55 and 56 are, for example, vertical orientation films.

A solution obtained by dispersing liquid crystal molecules in monomers is filled between the first translucent substrate 10 and the second translucent substrate 20. Subsequently, in a state where the monomers and the liquid crystal molecules are oriented by the first and the second orientation films 55 and 56, the monomers are polymerized by ultraviolet rays or heat to form a bulk 51. This process forms the liquid crystal layer 50 including the reverse-mode polymer dispersed liquid crystal in which the liquid crystal molecules are dispersed in gaps of a polymer network formed in a mesh shape.

In this manner, the liquid crystal layer 50 includes the bulk 51 formed of the polymers and a plurality of fine particles 52 dispersed in the bulk 51. The fine particles 52 include the liquid crystal. Both the bulk 51 and the fine particles 52 have optical anisotropy.

The orientation of the liquid crystal included in the fine particles 52 is controlled by a voltage difference between the pixel electrode 16 and the common electrode 22. The orientation of the liquid crystal is changed by the voltage applied to the pixel electrode 16. The degree of scattering of light passing through the pixel Pix changes in accordance with the change in the orientation of the liquid crystal.

For example, as illustrated in FIG. 8, the direction of an optical axis Ax1 of the bulk 51 is the same as the direction of an optical axis Ax2 of the fine particles 52 when no voltage is applied between the pixel electrode 16 and the common electrode 22. The optical axis Ax2 of the fine particles 52 is parallel to the PZ direction of the liquid crystal layer 50. The optical axis Ax1 of the bulk 51 is parallel to the PZ direction of the liquid crystal layer 50 regardless of whether the voltage is applied.

An ordinary-ray refractive index of the bulk 51 and that of the fine particles 52 are equal to each other. When no voltage is applied between the pixel electrode 16 and the common electrode 22, the difference of refractive index between the bulk 51 and the fine particles 52 is zero in all directions. The liquid crystal layer 50 becomes the non-scattering state of not scattering the light-source light L. The light-source light L propagates in a direction away from the light emitter 31 while being reflected by the first principal surface 10A of the first translucent substrate 10 and the first principal surface 20A of the second translucent substrate 20. When the liquid crystal layer 50 is in the non-scattering state of not scattering the light-source light L, a background on the first principal surface 20A side of the second translucent substrate 20 is visible from the first principal surface 10A of the first translucent substrate 10, and a background on the first principal surface 10A side of the first translucent substrate 10 is visible from the first principal surface 20A of the second translucent substrate 20.

As illustrated in FIG. 9, the optical axis Ax2 of the fine particle 52 is inclined by an electric field generated between the pixel electrode 16 and the common electrode 22 to which the voltage is applied. Since the optical axis Ax1 of the bulk 51 remains unchanged by the electric field, the direction of the optical axis Ax1 of the bulk 51 differs from the direction of the optical axis Ax2 of the fine particles 52. The light-source light L is scattered in the pixel Pix including the pixel electrode 16 to which the voltage is applied. As described above, the viewer views a part of the scattered light-source light L emitted outward from the first principal surface 10A of the first translucent substrate 10 or the first principal surface 20A of the second translucent substrate 20.

In the pixel Pix including the pixel electrode 16 to which no voltage is applied, the background on the first principal surface 20A side of the second translucent substrate 20 is visible from the first principal surface 10A of the first translucent substrate 10, and the background on the first principal surface 10A side of the first translucent substrate 10 is visible from the first principal surface 20A of the second translucent substrate 20. In the display device 1 of the present embodiment, when the input signal VS is entered from the image output portion 91, the voltage is applied to the pixel electrode 16 of the pixel Pix displaying an image, and the image in accordance with the second pixel input signal VCSA becomes visible together with the background.

The image displayed by the light-source light L, which is scattered in the pixel Pix including the pixel electrode 16 to which the voltage is applied and is emitted outward, superimposes the background to be displayed. In other words, the display device 1 of the present embodiment displays the image superimposing the background by combining the emission light 68 or the emission light 68A with the background.

Figure 10:
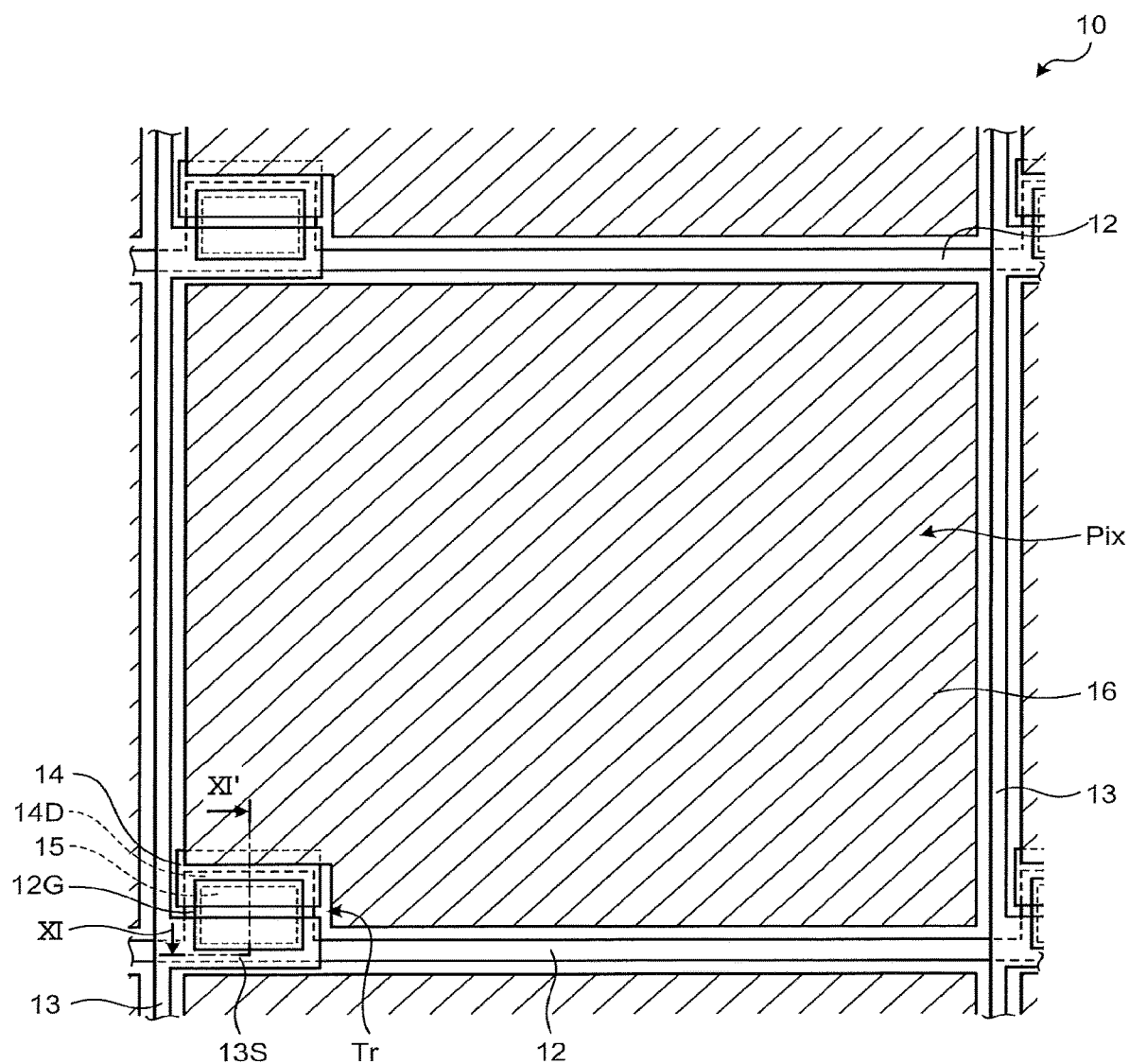
FIG. 10 is a plan view illustrating the pixel.
Figure 11:
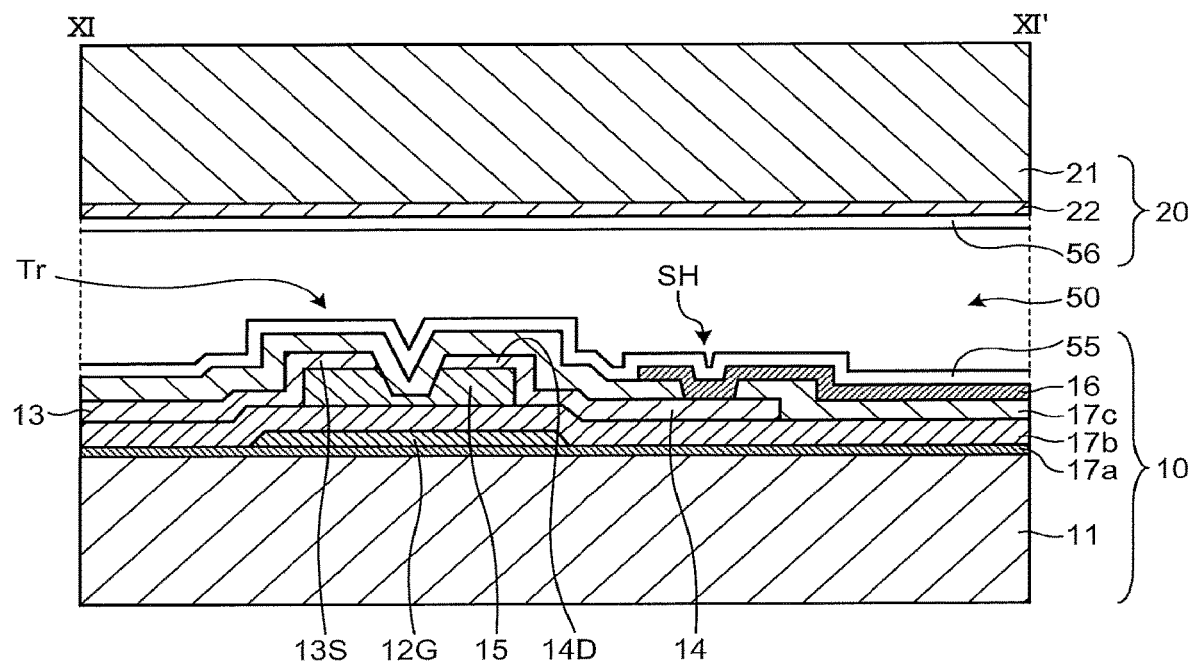
FIG. 11 is a sectional view along XI-XI' in FIG. 10.

FIG. 10 is a plan view illustrating the pixel. FIG. 11 is a sectional view along XI-XI' in FIG. 10. As illustrated in FIGS. 1, 2, and 10, the first translucent substrate 10 is provided with the signal lines 13 and the scanning lines 12 so as to form a grid in the plan view. A region surrounded by the adjacent scanning lines 12 and the adjacent signal lines 13 corresponds to the pixel Pix. The pixel Pix is provided with the pixel electrode 16 and the switching element Tr. In the present embodiment, the switching element Tr is a bottom-gate thin film transistor. The switching element Tr includes a semiconductor layer 15 overlapping, in the plan view, with a gate electrode 12G electrically coupled to corresponding one of the scanning lines 12.

The scanning line 12 is wiring made of a metal such as molybdenum (Mo) and aluminum (Al), a layered body of the aforementioned metal, or an alloy of the aforementioned metal. The signal line 13 is wiring made of a metal, such as aluminum, or an alloy.

The semiconductor layer 15 is provided so as not to protrude from the gate electrode 12G in the plan view. This configuration causes the light-source light L traveling from the gate electrode 12G toward the semiconductor layer 15 to be reflected, and is less likely to cause leakage of light in the semiconductor layer 15

As illustrated in FIG. 10, a source electrode 13S electrically coupled to corresponding one of the signal lines 13 overlaps with one end portion of the semiconductor layer 15 in the plan view.

As illustrated in FIG. 10, a drain electrode 14D is provided in a position adjacent to the source electrode 13S across a central portion of the semiconductor layer 15 in the plan view. The drain electrode 14D overlaps with the other end portion of the semiconductor layer 15 in the plan view. A portion not overlapping with either of the source electrode 13S or the drain electrode 14D serves as a channel of the switching element Tr. As illustrated in FIG.

11, conductive wiring 14 coupled to the drain electrode 14D is electrically coupled to the pixel electrode 16 at a through-hole SH.

As illustrated in FIG. 11, the first translucent substrate 10 includes a first base member 11 made of, for example, glass. The first base member 11 may be made of a resin, such as polyethylene terephthalate, as long as having translucency. A first insulating layer 17a is provided on the first base member 11, and the scanning line 12 and the gate electrode 12G are provided on the first insulating layer 17a. A second insulating layer 17b is provided to cover the scanning line 12. The first insulating layer 17a and the second insulating layer 17b are each made of, for example, a transparent inorganic insulating member, such as a silicon nitride member.

The semiconductor layer 15 is stacked on the second insulating layer 17b. The semiconductor layer 15 is made of, for example, amorphous silicon, but may be made of polysilicon or an oxide semiconductor.

The source electrode 13S that covers a part of the semiconductor layer 15, the signal line 13, the drain electrode 14D that covers a part of the semiconductor layer 15, and the conductive wiring 14 are provided on the second insulating layer 17b. The drain electrode 14D is made of the same material as that of the signal line 13. A third insulating layer 17c is provided on the semiconductor layer 15, the signal lines 13, and the drain electrode 14D. The third insulating layer 17c is made of, for example, a transparent inorganic insulating member, such as a silicon nitride member.

The pixel electrode 16 is provided on the third insulating layer 17c. The pixel electrode 16 is made of a translucent conductive member, such as an indium tin oxide (ITO) member. The pixel electrode 16 is electrically coupled to the conductive wiring 14 and the drain electrode 14D through contact holes provided in the third insulating layer 17c. The first orientation film 55 is provided on the pixel electrode 16.

The second translucent substrate 20 includes a second base member 21 made of, for example, glass. The second base member 21 may be made of a resin, such as polyethylene terephthalate, as long as having translucency. The second base member 21 is provided with the common electrode 22. The common electrode 22 is made of a translucent conductive member, such as an ITO member. The second orientation film 56 is provided on a surface of the common electrode 22.

Figure 12:
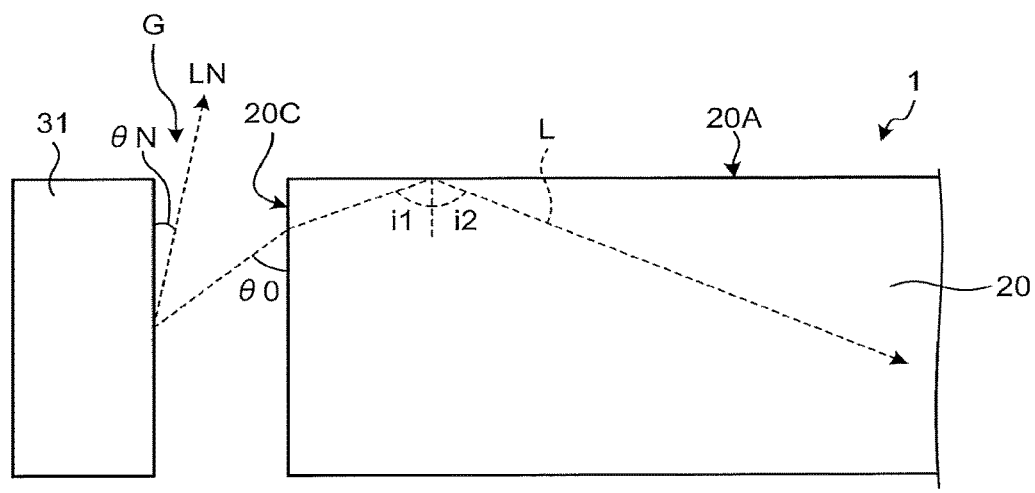
FIG. 12 is a diagram for explaining incident light from a light emitter.

FIG. 12 is a diagram for explaining the incident light from the light emitter. When light from the light emitter 31 enters the first side surface 20C of the second translucent substrate 20 at an angle θ0, the light enters the first principal surface 20A of the second translucent substrate 20 at an angle i1. If the angle i1 is larger than the critical angle, the light-source light L is fully reflected at an angle i2 by the first principal surface 20A of the second translucent substrate 20, and propagates through the inside of the second translucent substrate 20. Since the gap G is provided between the light emitter 31 and the first side surface 20C (light incident surface) as illustrated in FIG. 12, light-source light LN at an angle θN by which the angle i1 becomes smaller than the critical angle is not guided to the first side surface 20C of the second translucent substrate 20.

Figure 13:
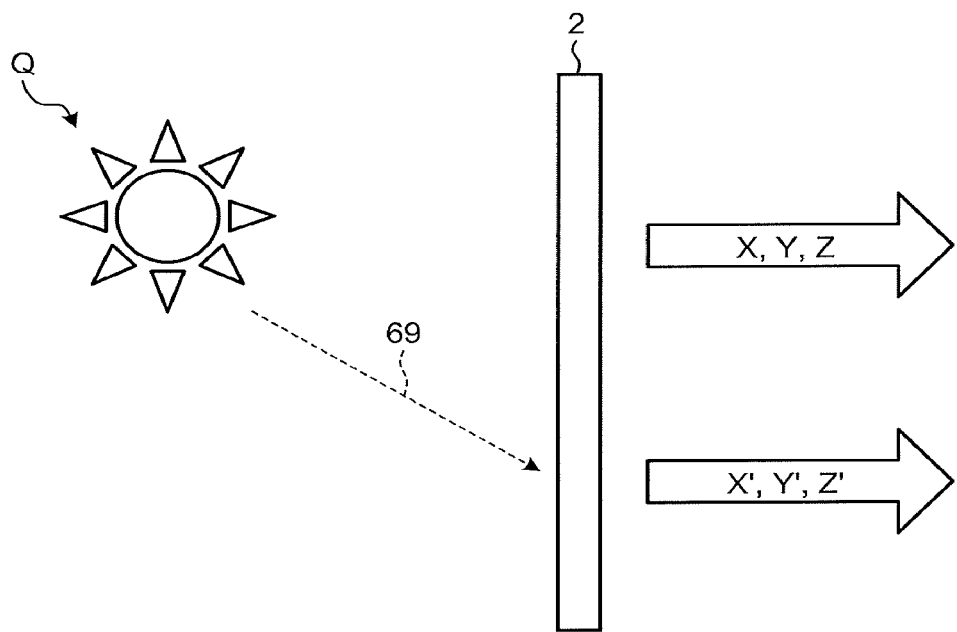
FIG. 13 is a diagram for explaining the influence of external light on display light in the pixel.
Figure 14:
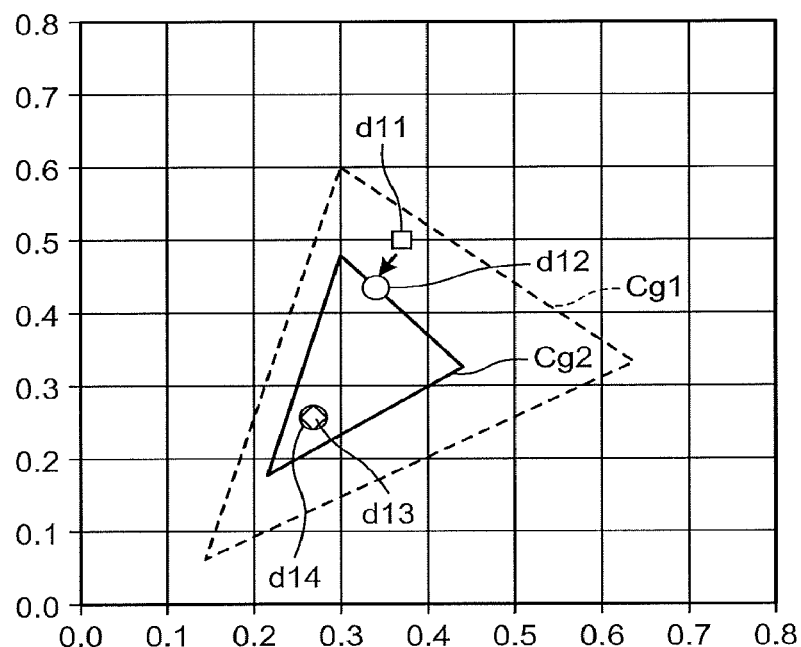
FIG. 14 is a diagram for explaining the influence of the external light on color gamuts of a display panel in an xy chromaticity diagram.

FIG. 13 is a diagram for explaining the influence of external light on display light in the pixel. FIG. 14 is a diagram for explaining the influence of the external light on color gamuts of the display panel in an xy chromaticity diagram. As illustrated in FIG. 13, when the external light 69 from the external light source Q enters the display panel 2, the external light 69 in addition to the emission light 68 is emitted as the display light. As a result, as illustrated in FIG. 13, the viewer views the emission light 68 having the tristimulus values (X,Y,Z) emitted by the display panel 2 and the light having the external light tristimulus values (X',Y', Z') transmitted through the display panel 2.

In the state where the external light is incident on the display panel 2, the external light that has entered the display panel 2 is scattered in the pixels Pix according to the applied voltage, and is also emitted as the emission light 68. In the state where the external light is incident on the display panel 2, the light-source light L and the external light are scattered, and the emission light 68 is viewed from the outside of the display panel 2. As a result, the image displayed on the display panel 2 has a mixed color obtained by mixing an input color of the image in accordance with the second pixel input signal VCS with the external light color. Consequently, the coordinates of a color displayed in a first color gamut Cg1 may be shifted to coordinates of a color displayed in the second color gamut Cg2 in the xy chromaticity diagram even if the image is displayed by the same input signal.

As illustrated in FIG. 14, a region of the second color gamut Cg2 that is displayable when the external light is present is smaller than a region of the first color gamut Cg1 that is displayable when the external light is not present.

Figure 15:
FIG. 15 is a diagram for explaining the color gamuts of FIG. 14.

FIG. 15 is a diagram for explaining the tristimulus values viewed by the viewer in the field-sequential system. In the field-sequential system, the tristimulus values in the color gamut emitted by the display panel 2 are represented as a table TCG1 in FIG. 15. When the external light is present, the external light is added in each of the first sub-frame RON, the second sub-frame GON, and the third sub-frame BON illustrated in FIG. 3. As a result, when the external light is present, the tristimulus values in a color gamut viewed by the viewer are represented as a table TCG2 in FIG. 15.

Figure 16:
FIG. 16 is another diagram for explaining the color gamuts of FIG. 14.
Figures 17, 18:
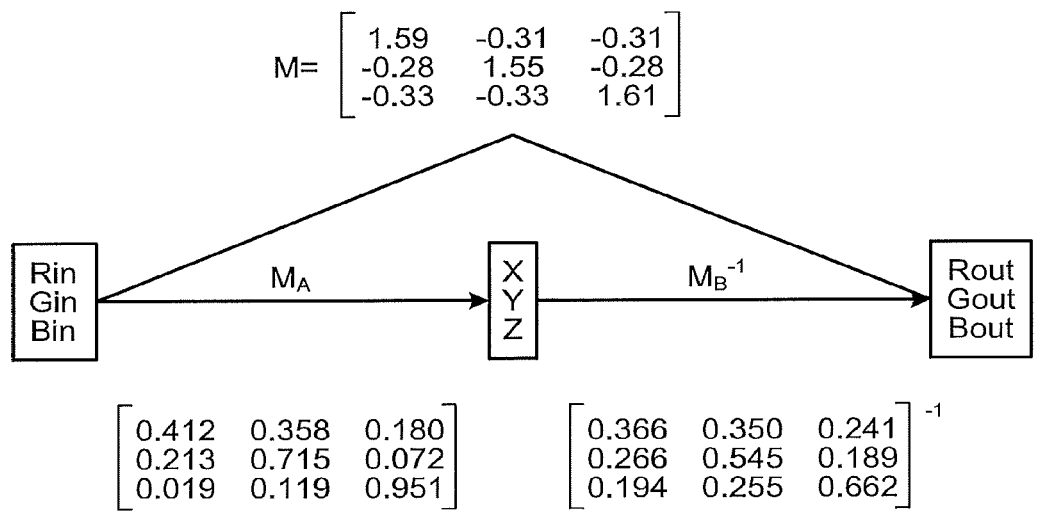
FIG. 17 is still another diagram for explaining the color gamuts of FIG. 14.
FIG. 18 is a diagram for explaining color conversion matrices for converting in color a first pixel input signal into a second pixel input signal in the embodiment.

FIG. 16 is a diagram for explaining the color gamuts of FIG. 14. FIG. 17 is another diagram for explaining the color gamuts of FIG. 14. The tristimulus values in the color gamut emitted by the display panel 2 are represented as the table TCG1 in FIG. 16. The tristimulus values of the external light are represented as a table TLD in FIG. 16. The tristimulus values in the color gamut viewed by the viewer are represented as the table TCG2 in FIG. 16.

The table TCG1 in FIG. 16 is represented as a table Tcg1 in chromaticity coordinates. The table Tcg1 represents the chromaticity coordinates (x,y) in the first color gamut Cg1. The table TCG2 in FIG. 16 is represented as a table Tcg2 in the chromaticity coordinates. The table Tcg2 represents the chromaticity coordinates (x,y) in the second color gamut Cg2.

FIG. 18 is a diagram for explaining color conversion matrices for converting in color the first pixel input signal into the second pixel input signal in the present embodiment. As illustrated in FIG. 18, color conversion matrices M, $M_A$, and $M_B$ are conversion matrices of three rows and three columns.

The color conversion matrix $M_A$ represented by Expression (1) below is a conversion matrix for converting the RGB signal into the tristimulus values (X,Y,Z) based on the description of the table TCG1 in FIG. 16.

$$M_A = \begin{bmatrix} 0.412 & 0.358 & 0.180 \\ 0.213 & 0.715 & 0.072 \\ 0.019 & 0.119 & 0.951 \end{bmatrix} \quad (1)$$

The color conversion matrix $M_D$ is obtained based on the table TCG2 in FIG. 16, as given in Expression (2) below. The color conversion matrix $M_B$ is a conversion matrix for converting the RGB signal into tristimulus values (X+X', Y+Y',Z+Z') in the second color gamut Cg2.

$$M_B = \begin{bmatrix} 0.366 & 0.350 & 0.241 \\ 0.266 & 0.545 & 0.189 \\ 0.194 & 0.255 & 0.662 \end{bmatrix} \quad (2)$$

The color conversion matrix M is calculated from the color conversion matrix $M_A$ and the inverse matrix of the color conversion matrix $M_D$, as given in Expression (3) below.

$$M = M_B^{-1} \times M_A = \begin{bmatrix} 1.59 & -0.31 & -0.31 \\ -0.28 & 1.55 & -0.28 \\ -0.33 & -0.33 & 1.61 \end{bmatrix} \quad (3)$$

A first input color [Rin,Gin,Bin] entered as the input signal is converted into a second input color [Rout,Gout, Bout] by the color conversion matrix M, as given in Expression (4) below. When the second input color [Rout,Gout, Bout] is displayed on the display panel 2 in the color gamut viewed by the viewer when the external light is present, the present embodiment prevents the second input color [Rout, Gout,Bout] from shifting from the first input color [Rin,Gin, Bin].

$$\begin{bmatrix} Rout \\ Gout \\ Bout \end{bmatrix} = M \times \begin{bmatrix} Rin \\ Gin \\ Bin \end{bmatrix} = \begin{bmatrix} RR & GR & BR \\ RG & GG & BG \\ RB & GB & BB \end{bmatrix} \times \begin{bmatrix} Rin \\ Gin \\ Bin \end{bmatrix} \quad (4)$$

In the present embodiment, the matrix of Expression (3) is used as the color conversion matrix M in Expression (4).

Figure 19:
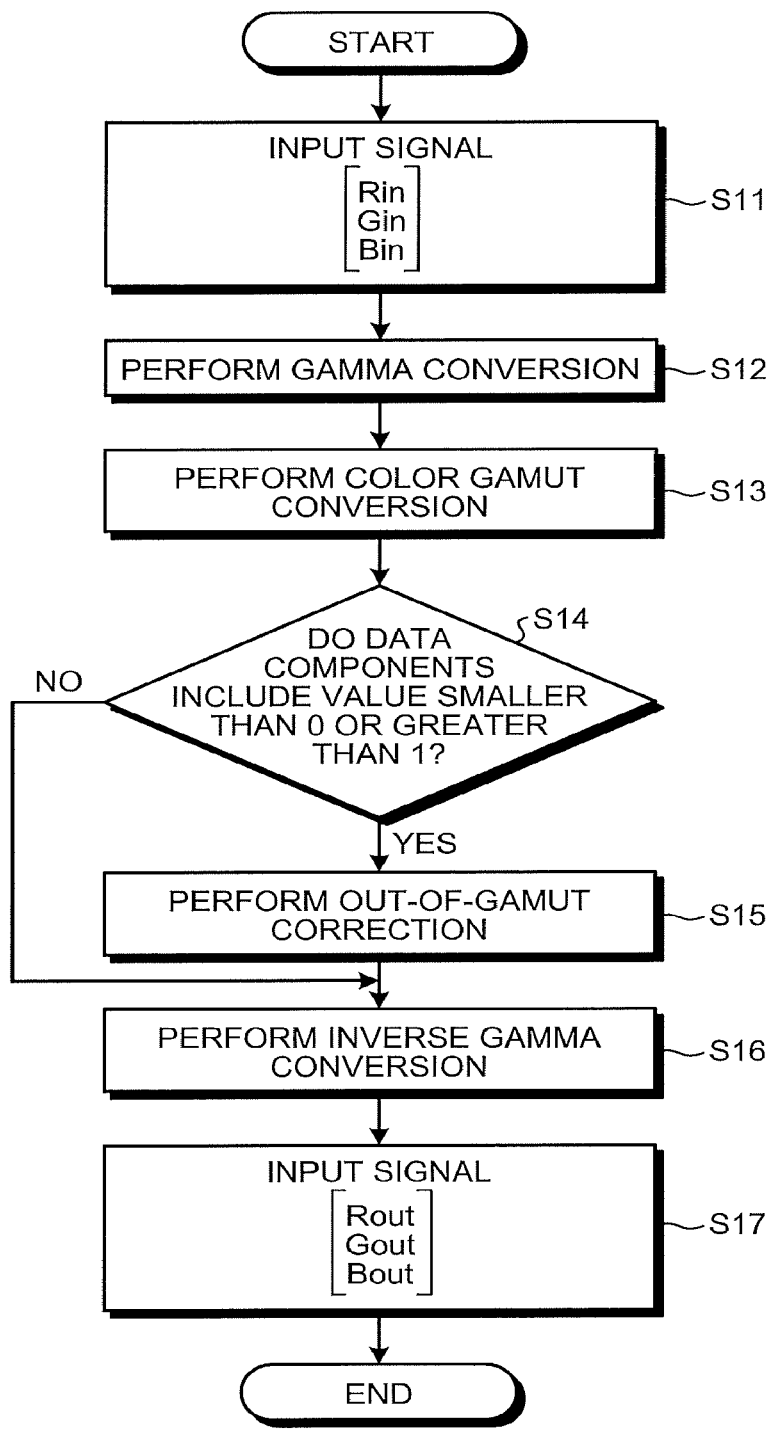
FIG. 19 is a flowchart for color conversion processing of the embodiment.

FIG. 19 is a flowchart for the color conversion processing of the present embodiment. The signal adjuster 414 illustrated in FIG. 2 receives an RGB signal [Rin,Gin,Bin] as the first pixel input signal VCS (Step S11).

Then, the RGB signal [Rin,Gin,Bin] is gamma-converted into a linear RGB signal (Step S12). The linear RGB signal is subjected to the color conversion (color gamut conversion) by the color conversion matrix M described above (Step S13).

If data components obtained by the color conversion include a value smaller than 0 or greater than 1 (Yes at Step S14), the signal adjuster 414 performs processing of out-of-gamut correction (Step S15). In the out-of-gamut correction (Step S15), a value or values smaller than 0 among the data components obtained by the color conversion is/are set to 0, and a value or values greater than 1 among the data components obtained by the color conversion is/are set to 1. The data components after being subjected to the out-of-gamut correction (Step S15) are inversely gamma-converted (Step S16). An RGB signal [Rout,Gout,Bout] obtained by the inverse gamma conversion serves as the second pixel input signal VCSA (Step S17).

If the data components obtained by the color conversion do not include a value smaller than 0 or greater than 1 (No at Step S14), the signal adjuster 414 performs the inverse gamma conversion (Step S16). The RGB signal [Rout,Gout, Bout] obtained by the inverse gamma conversion serves as the second pixel input signal VCSA (Step S17).

Figure 20:
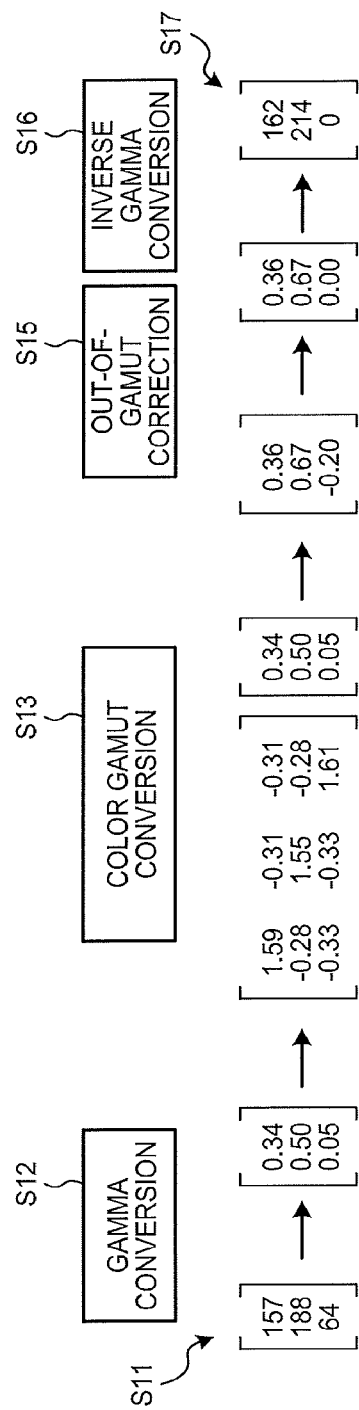
FIG. 20 is a diagram for explaining a conversion example of a pixel input signal according to the embodiment.

First conversion example of pixel input signal FIG. 20 is a diagram for explaining a conversion example of the pixel input signal according to the present embodiment. As illustrated in FIG. 20, an RGB signal [157,188,64] serving as a signal of the first input color is entered as the first pixel input signal VCS (Step S11). Then, the RGB signal [157,188,64] is gamma-converted (Step S12) into a signal [0.34,0.50, 0.05]. The signal [0.34,0.50,0.05] is subjected to the color gamut conversion using the color conversion matrix M as coefficients to be a signal [0.36,0.67,−0.20]. Since the data components include −0.20, which is smaller than 0 (Yes at Step S14), the out-of-gamut correction is performed to obtain a signal [0.36,0.67,0.00]. The signal [0.36,0.67,0.00] is inversely gamma-converted (Step S16) into an RGB signal [162,214,0], which serves as the second pixel input signal VCSA (Step S17).

Based on Expression (1) given above, the RGB signal [157,188,64] represents a first reproduced color d11 in the xy chromaticity diagram illustrated in FIG. 14. The RGB signal [162,214,0] represents a second reproduced color d12 in the xy chromaticity diagram illustrated in FIG. 14. According to the present embodiment, the second reproduced color d12 can be reproduced at an outer border of the second color gamut Cg2 even when the first reproduced color d11 is outside the second color gamut Cg2. As a result, the display device 1 can improve the color reproducibility of the image displayed on the display panel 2 even under the influence of the external light.

Second Conversion Example of Pixel Input Signal

Figure 21:
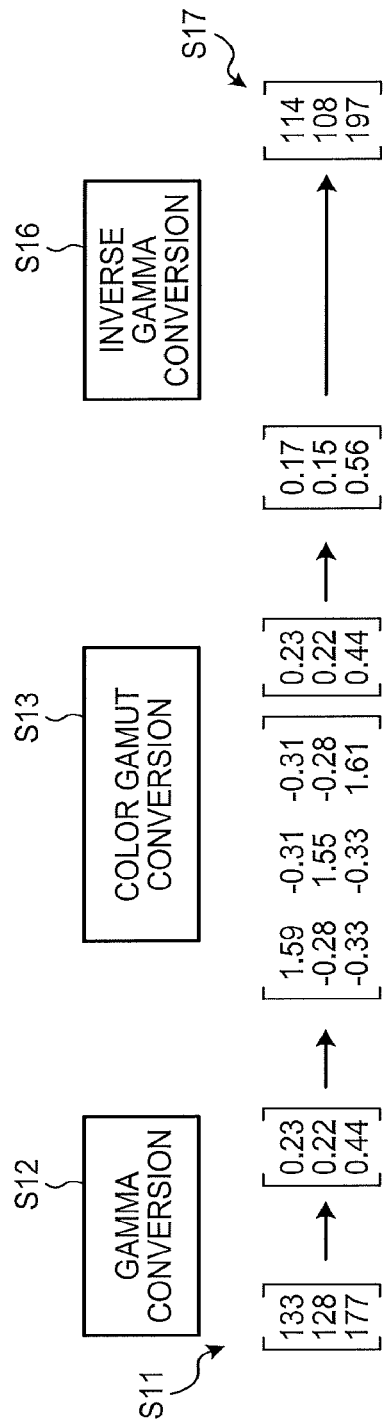
FIG. 21 is a diagram for explaining another conversion example of the pixel input signal according to the embodiment.

FIG. 21 is a diagram for explaining another conversion example of the pixel input signal according to the present embodiment. As illustrated in FIG. 21, an RGB signal [133,128,177] serving as a signal of the first input color is entered as the first pixel input signal VCS (Step S11). Then, the RGB signal [133,128,177] is gamma-converted (Step S12) into a signal [0.23,0.22,0.44]. The signal [0.23,0.22, 0.44] is subjected to the color gamut conversion using the color conversion matrix M as coefficients to be a signal [0.17,0.15,0.56]. Since the data components obtained by the color conversion do not include a value smaller than 0 or greater than 1 (No at Step S14), the signal [0.17,0.15,0.56] is inversely gamma-converted (Step S16) into an RGB signal [114,108,197], which serves as the second pixel input signal VCSA.

Based on Expression (1) given above, the RGB signal [133,128,177] represents a first reproduced color d13 in the xy chromaticity diagram illustrated in FIG. 14. Based on Expression (2) given above, the RGB signal [114,108,197] represents a second reproduced color d14 in the xy chromaticity diagram illustrated in FIG. 14. In this manner, the color shift is smaller between the first reproduced color d13 and the second reproduced color d14 in the xy chromaticity diagram illustrated in FIG. 14. Thus, the present embodiment prevents the color shift of the reproduced color even under the influence of the external light.

First Control Mode

Figure 22:
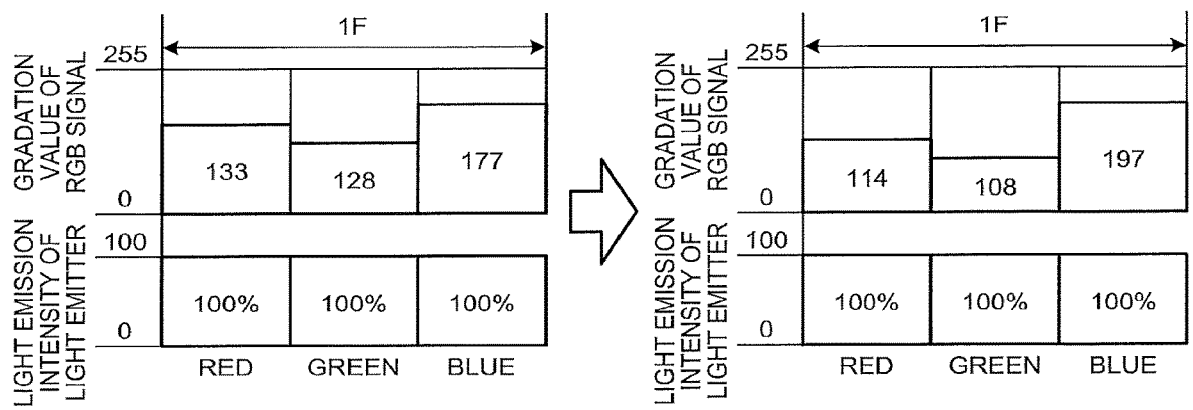
FIG. 22 illustrates an example of gradation values of a red-green-blue (RGB) signal and light emission intensities of a light emitter in a period of one frame in one pixel.

The following describes an example in which the signal adjuster 414 operates in the first control mode. FIG. 22 illustrates an example of gradation values of an RGB signal and light emission intensities of the light emitter in the period of one frame in one pixel. In the example illustrated in FIG. 22, each of the light emitter 34R of the first color, the light emitter 34G of the second color, and the light emitter 34B of the third color is driven so as to emit light at the same light emission intensity of 100%.

The light emitter 31 sequentially emits the light from the light emitter 34R of the first color, the light from the light emitter 34G of the second color, and the light from the light emitter 34B of the third color using the field-sequential system. The display controller 5 applies the voltage to the pixel electrode 16 according to the gradation value of each of the first color, the second color, and the third color in accordance with the second pixel input signal VCSA. The order of the light emission of the first color, the light emission of the second color, and the light emission of the third color may be any order as long as emission timing of each of the light of the first color, the light of the second color, and the light of the third color is synchronized with application timing of the voltage to the pixel electrode 16 according to the gradation value of each of the first, second, and third colors. The display controller 5 controls, for example, the amount of lighting of the light emitter 31 so as to emit the light of the first color, the light of the second color, and the light of the third color at the same light emission intensity.

When the RGB signal [133,128,177] of the first pixel input signal VCS is converted into the RGB signal [114, 108,197] of the second pixel input signal VCSA, the display device 1 can reproduce the second reproduced color d14 illustrated in FIG. 14.

As described above, the display device 1 includes the first translucent substrate 10, the second translucent substrate 20, the liquid crystal layer 50, the light emitter 31, and the display controller 5. The light emitter 31 faces at least one of a side surface of the first translucent substrate 10 and a side surface of the second translucent substrate 20. The display controller 5 includes the external light analyzer 412 and the signal adjuster 414. The external light analyzer 412 sets, in accordance with the received signal ELV of the external light information, the second color gamut Cg2 different from the first color gamut Cg1 that is displayable when the external light is not present. The signal adjuster 414 converts in color the first pixel input signal VCS into the second pixel input signal VCSA that reduces the color shift of the second reproduced color d14 reproduced in the second color gamut Cg2 from the first reproduced color d13 reproduced in the first color gamut Cg1 in accordance with the first pixel input signal VCS.

This configuration allows the display device 1 to improve the color reproducibility of the image displayed on the display panel 2 even under the influence of the external light.

Second Control Mode

Figure 23:
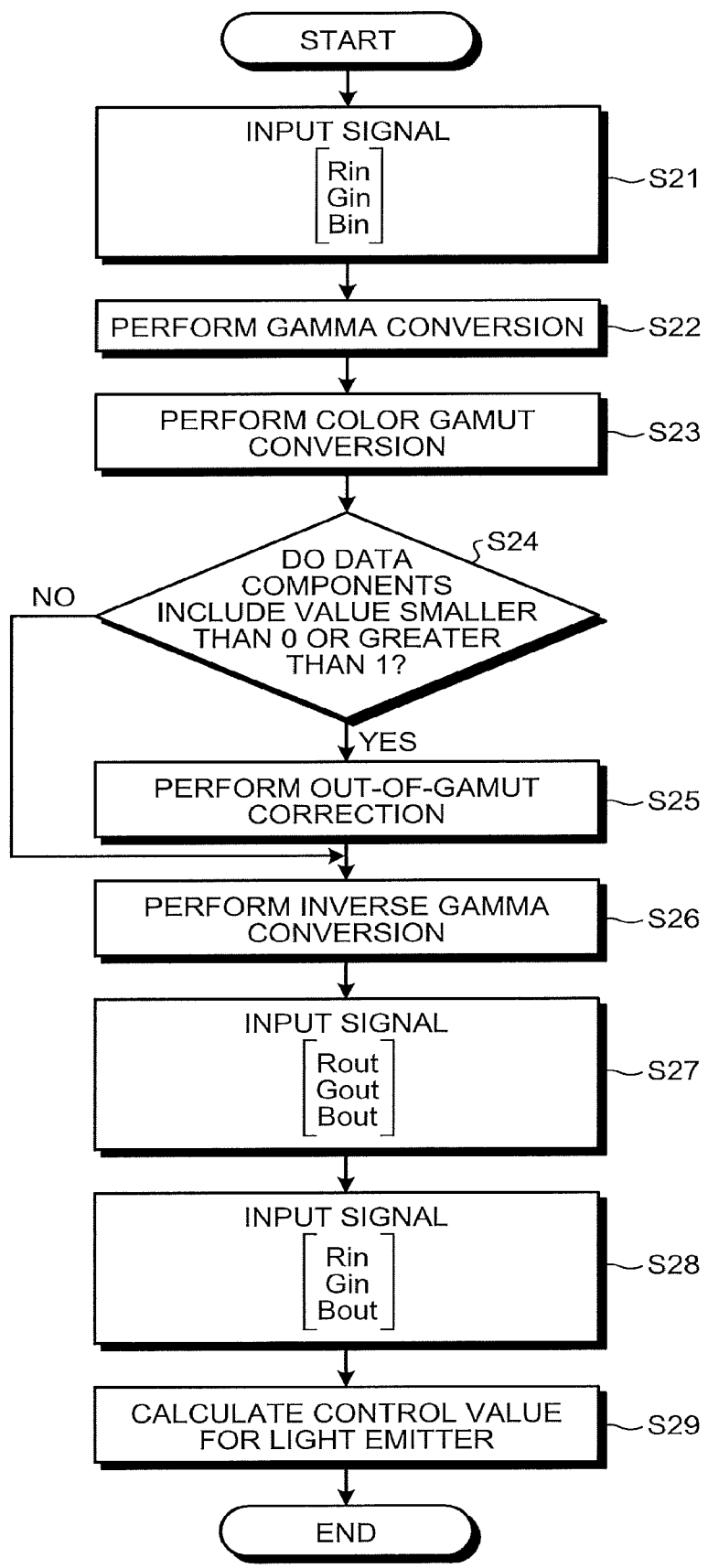
FIG. 23 is another flowchart for the color conversion processing of the embodiment.
Figure 24:
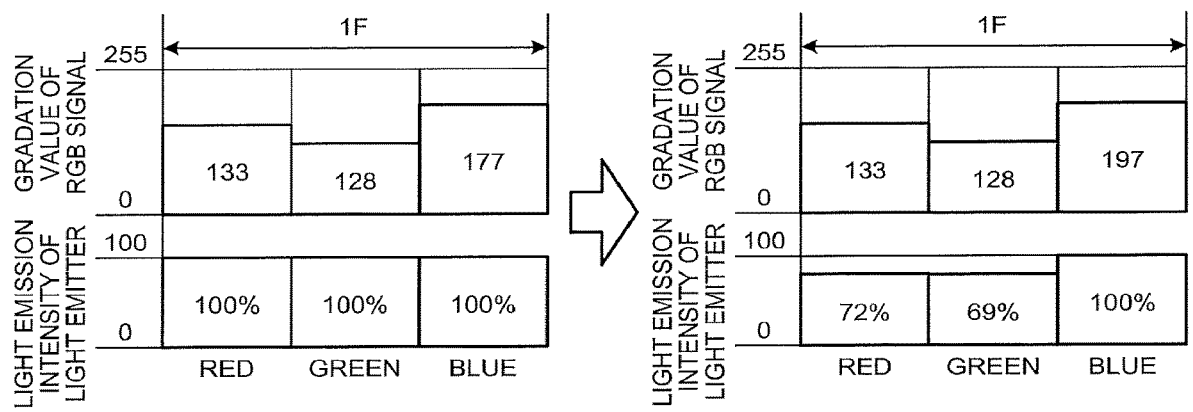
FIG. 24 illustrates another example of the gradation values of the RGB signal and the light emission intensities of the light emitter in the period of one frame in one pixel.

The following describes an example in which the signal adjuster 414 operates in the second control mode. FIG. 23 is another flowchart for the color conversion processing of the present embodiment. FIG. 24 illustrates another example of the gradation values of the RGB signal and the light emission intensities of the light emitter in the period of one frame in one pixel. Steps S21 to S26 in FIG. 26 correspond to Steps S11 to S16, respectively, in FIG. 19, and will therefore not be described in detail.

Also in the second control mode, the signal adjuster 414 performs the inverse gamma conversion at Step S26 to obtain the RGB signal [Rout,Gout,Bout] (Step S27). The signal adjuster 414 compares the RGB signal [Rin,Gin,Bin] with the RGB signal [Rout,Gout,Bout]. The signal adjuster 414 combines gradation values among the gradation values of the RGB signal [Rout,Gout,Bout] that are higher than the respective gradation values of the RGB signal [Rin,Gin,Bin] with gradation values among the gradation values of the RGB signal [Rin,Gin,Bin] that are equal to or lower than the respective gradation values of the RGB signal [Rout,Gout,Bout] to calculate gradation values of an RGB signal of a third pixel input signal. In other words, the signal adjuster 414 compares the gradation values of the RGB signal [Rout,Gout,Bout] with the gradation values of the RGB signal [Rin,Gin,Bin] on a color-by-color basis, and selects a higher gradation value of each color to calculate a gradation value of corresponding one of the first, second, and third colors of the third pixel input signal (Step S28). For example, the RGB signal [Rin,Gin,Bin] is compared with the RGB signal [Rout,Gout,Bout], and if the relations hold as Rin>Rout, Gin>Gout, and Bin<Bout, the third pixel input signal is set to an RGB signal [Rin,Gin,Bout].

To explain the calculation using the second conversion example of the pixel input signal described above, the RGB signal [133,128,177] of the first pixel input signal VCS is converted into an RGB signal [133,128,197] of the second pixel input signal VCSA, as illustrated in FIG. 24.

In the case of the light emission intensity of blue serving as the third color illustrated in FIG. 24, if the gradation value [177] of the third color in the first pixel input signal VCS specifies that the light emitter 31 is to emit light at a light emission intensity of 100%, the gradation value [197] of the third color in the second pixel input signal VCSA specifies that the light emitter 31 is to emit light at the light emission intensity of 100%. That is, in the case of the third color, the light emitter control value of the light source control signal LCS is equal to the light emitter control value of the light source control signal LCSA. In the example illustrated in FIG. 24, the light emitter control value is the light emission intensity.

In the case of the light emission intensity of red serving as the first color illustrated in FIG. 24, if the gradation value [133] of the first color in the first pixel input signal VCS specifies that the light emitter 31 is to emit light at a light emission intensity of 100%, the gradation value [133] of the first color in the second pixel input signal VCSA specifies that the light emitter 31 is to emit light at a light emission intensity of 72%.

In the case of the light emission intensity of green serving as the second color illustrated in FIG. 24, if the gradation value [128] of the second color in the first pixel input signal VCS specifies that the light emitter 31 is to emit light at a light emission intensity of 100%, the gradation value [128] of the second color in the second pixel input signal VCSA specifies that the light emitter 31 is to emit light at a light emission intensity of 69%.

The ratios [72%,69%,100%] in the light emission intensities of the first, second, and third colors of the light emitter illustrated in FIG. 24 are calculated such that the above-described second reproduced color d14 can be reproduced when the display controller 5 sequentially applies the voltage to the pixel electrode 16 according to each of the gradation values of the RGB signal [133,128,197].

As described above, the signal adjuster 414 compares the gradation values of the RGB signal [Rout,Gout,Bout] with the gradation values of the RGB signal [Rin,Gin,Bin] on a color-by-color basis, and selects the higher gradation value of each color to calculate the gradation value of corresponding one of the first, second, and third colors of the third pixel input signal (Step S28). For example, the RGB signal [Rin,Gin,Bin] is compared with the RGB signal [Rout,Gout,Bout], and if the relations hold as Rin>Rout, Gin>Gout, and Bin<Bout, the third pixel input signal is set to the RGB signal [Rin,Gin,Bout]. For each of Rin and Gin among those of the RGB signal [Rin,Gin,Bout] of the third pixel input signal that are equal to those of the RGB signal [Rin,Gin,Bin] of the first pixel input signal, the display controller 5 sets the light emission intensity ratio to a value lower than the same light emission intensity ratio as that in the case where the display controller 5 sequentially applies the voltage to the pixel electrode 16 according to each of the gradation values of the RGB signal [Rin,Gin,Bin] of the first pixel input signal. For Bout equal to that of the RGB signal [Rout,Gout,Bout] of the second pixel input signal, the ratio in the light emission intensity of the light emitter serving as the light emitter control value is not changed from the same light emission intensity ratio as that in the case where the display controller 5 sequentially applies the voltage to the pixel electrode 16 according to each of the gradation values of the RGB signal [Rin,Gin,Bin] of the first pixel input signal. In this manner, if the display controller 5 sequentially applies the voltage to the pixel electrode 16 according to the RGB signal [Rin,Gin,Bout] of the third pixel input signal, the display controller 5 calculates the light emission intensities of the first, second, and third colors of the light emitter according to the RGB signal [Rin,Gin,Bout] of the third pixel input signal (Step S29).

As described above, in the second control mode, the signal adjuster 414 generates the RGB signal [133,128,197] of the second pixel input signal VCSA from the RGB signal [133,128,177] of the first pixel input signal VCS according to the adjustment signal LAS, and transmits the RGB signal [133,128,197] to the pixel controller 42. The signal adjuster 414 then generates the light source control signal LCSA of the ratios [72%,69%,100%] in the light emission intensity of the light emitter from the light source control signal LCS according to the adjustment signal LAS, and transmits the light source control signal LCSA to the light source controller 32.

As a result, the present embodiment prevents the color shift of the reproduced color even under the influence of the external light.

Figure 25:
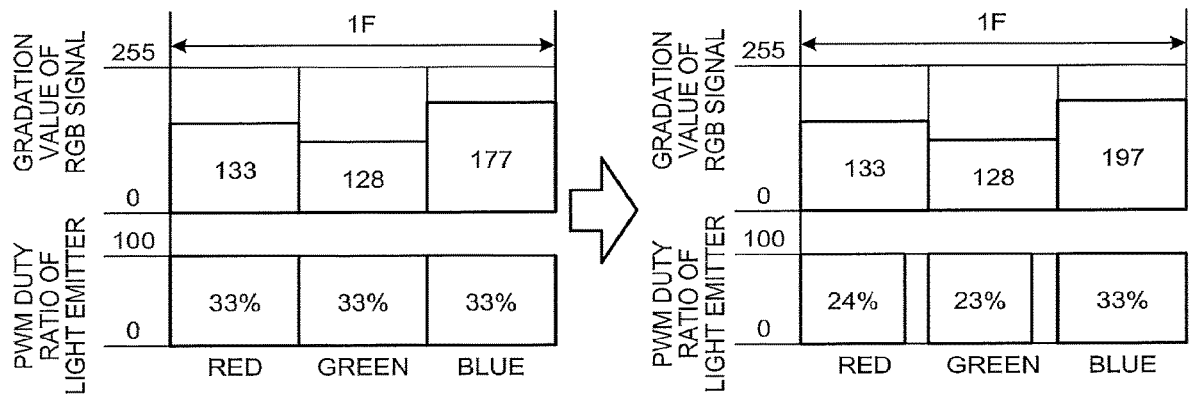
FIG. 25 illustrates an example of the gradation values of the RGB signal and light emission pulse width (PW) duty ratios of the light emitter in the period of one frame in one pixel.

FIG. 25 illustrates an example of the gradation values of the RGB signal and light emission PW duty ratios of the light emitter in the period of one frame in one pixel. The light emitter 31 can modulate light at a duty ratio of pulse width modulation (PWM). The light emitter control value may be the PWM duty ratio as illustrated in FIG. 25.

In the case of the light emission intensity of blue serving as the third color illustrated in FIG. 25, if the gradation value [177] of the third color in the first pixel input signal VCS specifies that the light emitter 31 is to emit light at a PWM duty ratio of 33%, the gradation value [197] of the third color in the second pixel input signal VCSA specifies that the light emitter 31 is to emit light at the PWM duty ratio of 33%. That is, in the case of the third color, the light emitter control value of the light source control signal LCS is equal to the light emitter control value of the light source control signal LCSA. In the example illustrated in FIG. 25, the light emitter control value is the PWM duty ratio.

In the case of the light emission intensity of red serving as the first color illustrated in FIG. 25, if the gradation value [133] of the first color in the first pixel input signal VCS specifies that the light emitter 31 is to emit light at a PWM duty ratio of 33%, the gradation value of the first color in the second pixel input signal VCSA specifies that the light emitter 31 is to emit light at a PWM duty ratio of 24%.

In the case of the light emission intensity of green serving as the second color illustrated in FIG. 25, if the gradation value [128] of the second color in the first pixel input signal VCS specifies that the light emitter 31 is to emit light at a PWM duty ratio of 33%, the gradation value [128] of the second color in the second pixel input signal VCSA specifies that the light emitter 31 is to emit light at a PWM duty ratio of 23%.

The PWM duty ratios [24%,23%,33%] of the first, second, and third colors of the light emitter illustrated in FIG. 25 are calculated such that the above-described second reproduced color d14 can be reproduced when the display controller 5 sequentially applies the voltage to the pixel electrode 16 according to each of the gradation values of the RGB signal [133,128,197].

The signal adjuster 414 combines the gradation values among the gradation values of the RGB signal [Rout,Gout,Bout] that are higher than the respective gradation values of the RGB signal [Rin,Gin,Bin] with the gradation values among the gradation values of the RGB signal [Rin,Gin,Bin] that are equal to or lower than the respective gradation values of the RGB signal [Rout,Gout,Bout], to calculate the gradation values of the RGB signal of the third pixel input signal (Step S28). For example, the RGB signal [Rin,Gin,Bin] is compared with the RGB signal [Rout,Gout,Bout], and if the relations hold as Rin>Rout, Gin>Gout, and Bin<Bout, the third pixel input signal is set to the RGB signal [Rin,Gin,Bout]. For each of Rin and Gin among those of the RGB signal [Rin,Gin,Bout] of the third pixel input signal that are equal to those of the RGB signal [Rin,Gin,Bin] of the first pixel input signal, the display controller 5 sets the PWM duty ratio to a value lower than the same PWM duty ratio as that in the case where the display controller 5 sequentially applies the voltage to the pixel electrode 16 according to each of the gradation values of the RGB signal [Rin,Gin,Bin] of the first pixel input signal. For Bout equal to that of the RGB signal [Rout,Gout,Bout] of the second pixel input signal, the PWM duty ratio of the light emitter serving as the light emitter control value is not changed from the same PWM duty ratio as that in the case where the display controller 5 sequentially applies the voltage to the pixel electrode 16 according to each of the gradation values of the RGB signal [Rin,Gin,Bin] of the first pixel input signal. In this manner, if the display controller 5 sequentially applies the voltage to the pixel electrode 16 according to the RGB signal [Rin,Gin,Bout] of the third pixel input signal, the display controller 5 calculates the light emission intensities of the first, second, and third colors of the light emitter according to the RGB signal [Rin,Gin,Bout] of the third pixel input signal (Step S29).

As described above, in the second control mode, the signal adjuster 414 generates the RGB signal [133,128,197] of the second pixel input signal VCSA from the RGB signal [133,128,177] of the first pixel input signal VCS according to the adjustment signal LAS, and transmits the RGB signal [133,128,197] to the pixel controller 42. The signal adjuster 414 then generates the light source control signal LCSA including the information on the PWM duty ratios [24%, 23%,33%] of the first, second, and third colors of the light emitter from the light source control signal LCS according to the adjustment signal LAS, and transmits the light source control signal LCSA to the light source controller 32.

As a result, the present embodiment prevents the color shift of the reproduced color even under the influence of the external light.

First Modification

Figure 26:
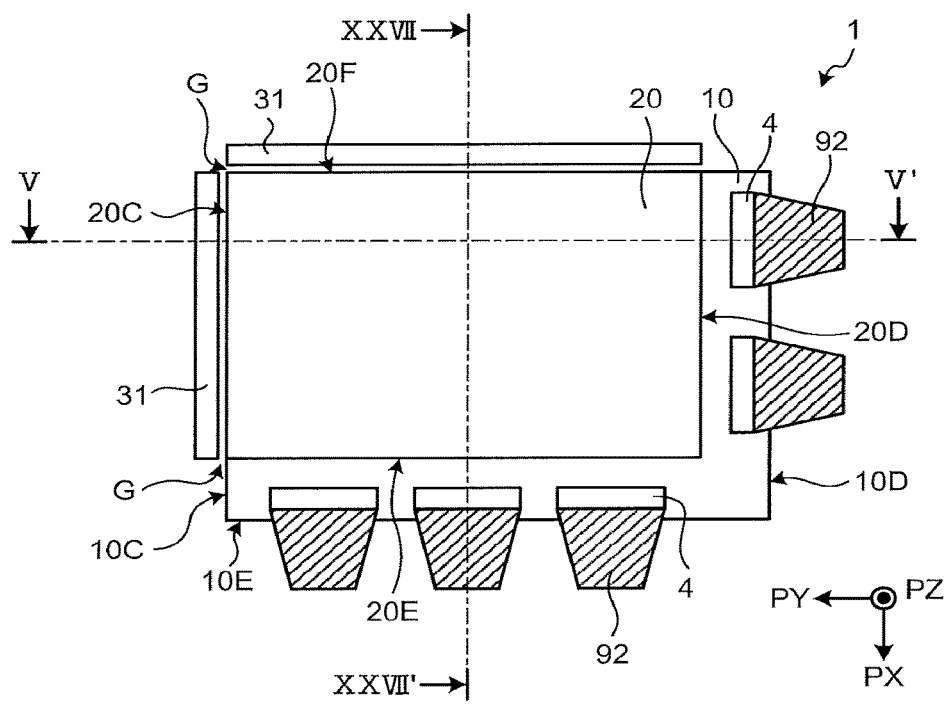
FIG. 26 is a plan view illustrating a plane of a display device according to a first modification of the embodiment.
Figure 27:
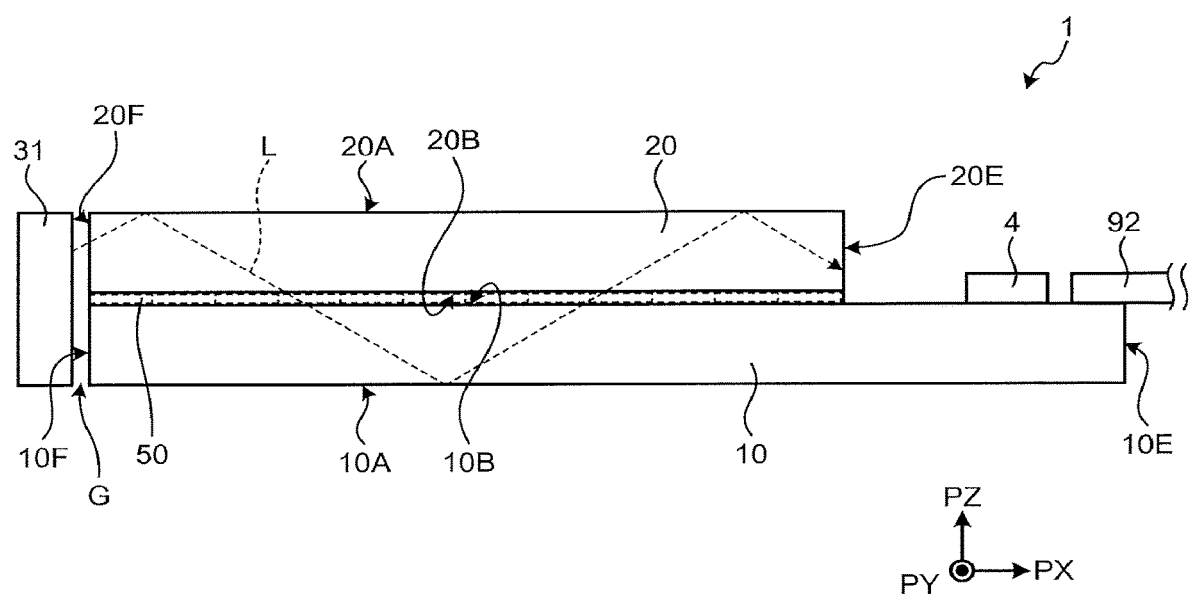
FIG. 27 is a sectional view along XXVII-XXVII' in FIG. 26.

FIG. 26 is a plan view illustrating a plane of a display device according to a first modification of the embodiment. FIG. 27 is a sectional view along XXVII-XXVII' in FIG. 26. The same components as those described above in the present embodiment are denoted by the same reference numerals, and the description thereof will not be repeated. Since the section along V-V' in FIG. 26 is the same as that of the display device of the present embodiment illustrated in FIG. 5, the description thereof will not be repeated.

As illustrated in FIGS. 26 and 27, one of the light emitters 31 faces the fourth side surface 20F of the second translucent substrate 20. As illustrated in FIG. 27, the light emitter 31 emits the light-source light L to the fourth side surface 20F of the second translucent substrate 20. The fourth side surface 20F of the second translucent substrate 20 facing the light emitter 31 serves as a light incident surface. The gap G is provided between the light emitter 31 and the light incident surface. The gap G forms an air layer.

As illustrated in FIG. 27, the light-source light L emitted from the light emitter 31 propagates in a direction away from the fourth side surface 20F while being reflected by the first principal surface 10A of the first translucent substrate 10 and the first principal surface 20A of the second translucent substrate 20.

The display device 1 according to the first modification of the present embodiment includes the first translucent substrate 10, the second translucent substrate 20, the liquid crystal layer 50, and the light emitters 31. One of the two light emitters 31 faces the first side surface 20C of the second translucent substrate 20 and the other thereof faces the fourth side surface 20F of the second translucent substrate 20. This configuration increases the light quantity of in-plane light emitted from the two light emitters 31 and propagating in the display panel 2. The configuration also increases uniformity of the in-plane light propagating in the display panel 2. A region P1 and a region P2 illustrated in FIG. 6 differ in distance from the light emitter 31, and therefore differ in in-plane light quantity. In contrast, in the display device 1 according to the first modification of the present embodiment, the light propagates from two intersecting directions, thereby decreasing the difference in in-plane light quantity.

Second Modification

Figure 28:
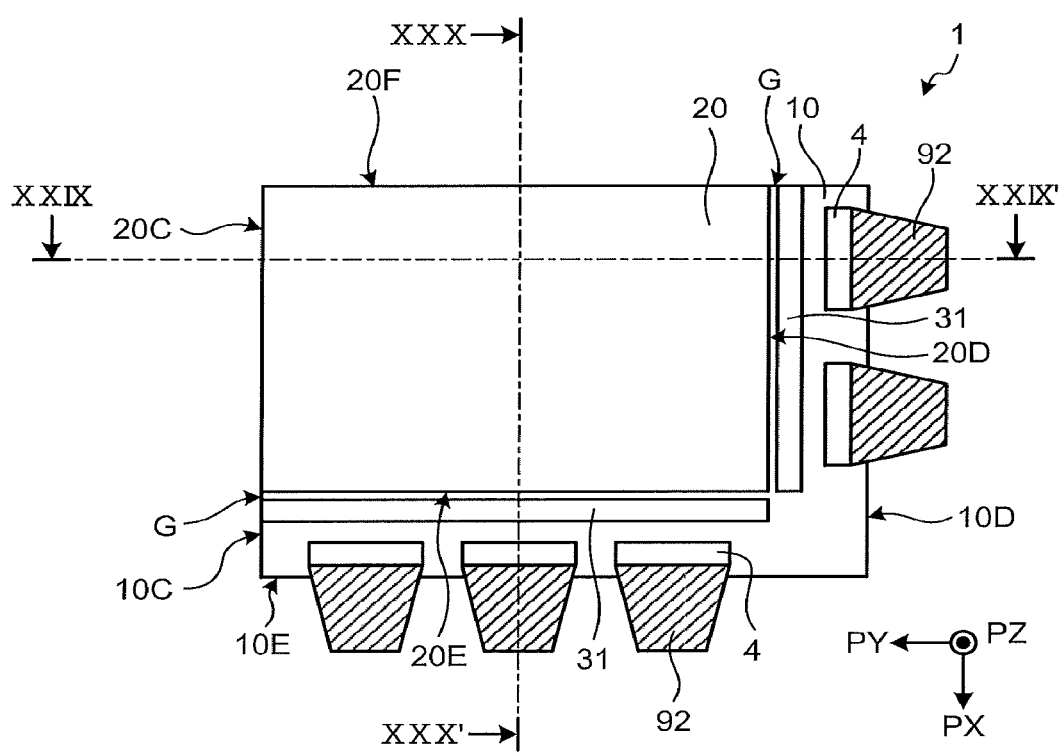
FIG. 28 is a plan view illustrating a plane of a display device according to a second modification of the embodiment.
Figure 29:
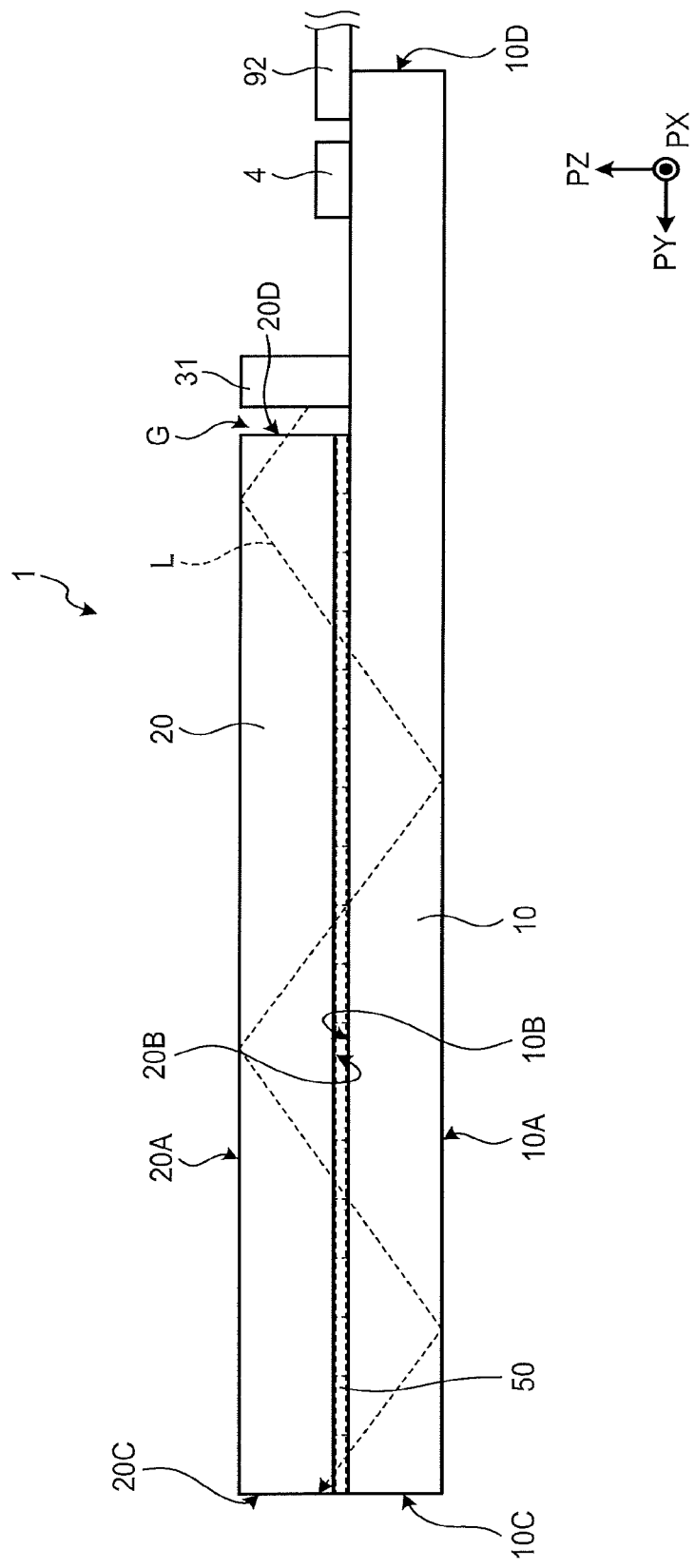
FIG. 29 is a sectional view along XXIX-XXIX' in FIG. 28.
Figure 30:
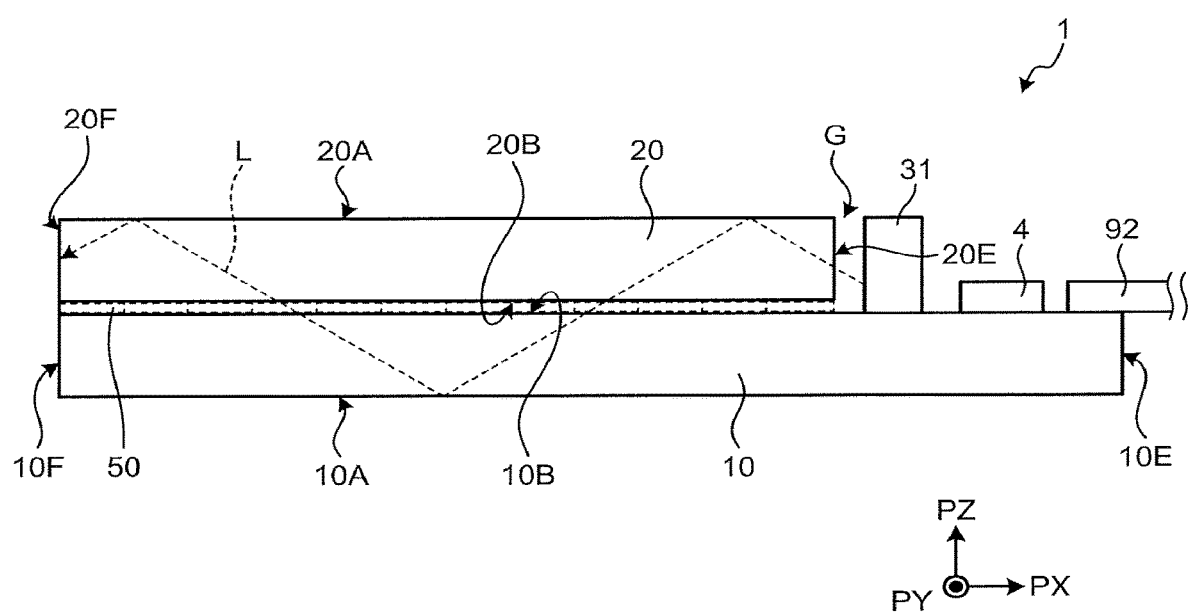
FIG. 30 is a sectional view along XXX-XXX' in FIG. 28.

FIG. 28 is a plan view illustrating a plane of a display device according to a second modification of the present embodiment. FIG. 29 is a sectional view along XXIX-XXIX' in FIG. 28. FIG. 30 is a sectional view along XXX-XXX' in FIG. 28. The same components as those described above in the present embodiment or the modification thereof are denoted by the same reference numerals, and the description thereof will not be repeated.

As illustrated in FIGS. 28 and 29, one of the light emitters 31 faces the second side surface 20D of the second translucent substrate 20. As illustrated in FIG. 29, the light emitter 31 emits the light-source light L to the second side surface 20D of the second translucent substrate 20. The second side surface 20D of the second translucent substrate 20 facing the light emitter 31 serves as a light incident surface. The gap G is provided between the light emitter 31 and the light incident surface. The gap G forms an air layer.

As illustrated in FIG. 29, the light-source light L emitted from the light emitter 31 propagates in a direction away from the second side surface 20D while being reflected by the first principal surface 10A of the first translucent substrate 10 and the first principal surface 20A of the second translucent substrate 20.

As illustrated in FIGS. 28 and 30, the other of the light emitters 31 faces the third side surface 20E of the second translucent substrate 20. As illustrated in FIG. 30, the light emitter 31 emits the light-source light L to the third side surface 20E of the second translucent substrate 20. The third side surface 20E of the second translucent substrate 20 facing the light emitter 31 serves as a light incident surface. The gap G is provided between the light emitter 31 and the light incident surface. The gap G forms an air layer.

As illustrated in FIG. 30, the light-source light L emitted from the light emitter 31 propagates in a direction away from the third side surface 20E while being reflected by the first principal surface 10A of the first translucent substrate 10 and the first principal surface 20A of the second translucent substrate 20.

The display device 1 according to the second modification of the present embodiment includes the first translucent substrate 10, the second translucent substrate 20, the liquid crystal layer 50, and the light emitters 31. One of the two light emitters 31 faces the second side surface 20D of the second translucent substrate 20, and the other thereof faces the third side surface 20E of the second translucent substrate 20. This configuration increases the light quantity of the in-plane light emitted from the two light emitters 31 and propagating in the display panel 2. The configuration also increases uniformity of the in-plane light propagating in the display panel 2. The region P1 and the region P2 illustrated in FIG. 6 differ in distance from the light emitter 31, and therefore differ in in-plane light quantity. In contrast, in the display device 1 according to the second modification of the present embodiment, the light propagates from two intersecting directions, thereby decreasing the difference in in-plane light quantity.

In the same manner as the present embodiment, the display device 1 according to the second modification of the present embodiment does not include a backlight device or a reflecting plate on the first principal surface 10A side of the first translucent substrate 10 or on the first principal surface 20A side of the second translucent substrate 20. As a result, the background on the first principal surface 20A side of the second translucent substrate 20 is visible from the first principal surface 10A of the first translucent substrate 10, and the background on the first principal surface 10A side of the first translucent substrate 10 is visible from the first principal surface 20A of the second translucent substrate 20.

The preferred embodiment of the present disclosure has been described. However, the present disclosure is not limited by the embodiment. The content disclosed in the embodiment is merely an example, and various modifications can be made without departing from the gist of the present disclosure. Appropriate modifications made without departing from the gist of the present disclosure obviously belong to the technical scope of the present disclosure. All the technologies that can be appropriately designed, modified, and implemented by a person skilled in the art on the basis of the above-described disclosure belong to the technical scope of the present disclosure as long as the technologies include the gist of the present disclosure.

The display panel 2 may be, for example, a passive-matrix panel without a switching element. The passive-matrix panel includes first electrodes extending in the PX direction, second electrodes extending in the PY direction, in the plan view, and wiring electrically coupled to the first electrodes or the second electrodes. The first and second electrodes and the wiring are made of, for example, ITO. For example, the first translucent substrate 10 including the first electrodes and the second translucent substrate 20 including the second electrodes face each other across the liquid crystal layer 50.

Although the example has been described in which the first and the second orientation films 55 and 56 are vertical orientation films, the first and the second orientation films 55 and 56 may be both horizontal orientation films. The first orientation film 55 and the second orientation film 56 only need to have a function to orient the monomers in a predetermined direction in polymerizing the monomers. This allows the monomers to become polymers oriented in the predetermined direction. When the first orientation film 55 and the second orientation film 56 are the horizontal orientation films, the direction of the optical axis Ax1 of the bulk 51 and the direction of the optical axis Ax1 of the fine particle 52 are the same, and are orthogonal to the PZ direction, in a state in which no voltage is applied between the pixel electrode 16 and the common electrode 22. The direction orthogonal to the PZ direction corresponds to the PX direction or the PY direction along a side of the first translucent substrate 10 in the plan view.

The embodiment and the modifications include the following aspects.

(1) A display device comprising:

a first translucent substrate;

a second translucent substrate facing the first translucent substrate;

a liquid crystal layer including polymer dispersed liquid crystal sealed between the first translucent substrate and the second translucent substrate;

at least one light emitter facing at least one of a side surface of the first translucent substrate or a side surface of the second translucent substrate; and a display controller including:

an external light analyzer configured to set, in accordance with a received signal of external light information, a second color gamut different from a first color gamut displayable when the external light is not present; and a signal adjuster configured to convert in color a first pixel input signal into a second pixel input signal that reduces a color shift of a second reproduced color reproduced in the second color gamut from a first reproduced color reproduced in the first color gamut in accordance with the first pixel input signal.

(2) The display device according to (1), wherein the first translucent substrate has a first principal surface and a second principal surface that is a plane parallel to the first principal surface, the second translucent substrate has a first principal surface and a second principal surface that is a plane parallel to the first principal surface, and when the polymer dispersed liquid crystal is in a non-scattering state, a background on the first principal surface side of the second translucent substrate is visible from the first principal surface of the first translucent substrate, or a background on the first principal surface side of the first translucent substrate is visible from the first principal surface of the second translucent substrate.

(3) The display device according to (1) or (2), further comprising a first electrode and a second electrode interposing the liquid crystal layer therebetween, wherein the light emitter is configured to sequentially emit light of a first color, light of a second color, and light of a third color using a field-sequential system, and the display controller is configured to control the light emitter to emit the light of the first color, the light of the second color, and the light of the third color at the same light emission intensity, and applies a voltage to the first electrode according to a gradation value of each of the first color, the second color, and the third color in accordance with the second pixel input signal.

(4) The display device according to any one of (1) to (3), wherein the signal adjuster is configured to convert a first input color of the first pixel input signal into a second input color of the second pixel input signal using a third color conversion matrix obtained by multiplying a first color conversion matrix to convert a red-green-blue (RGB) signal in the first color gamut into tristimulus values (X,Y,Z) by an inverse matrix of a second conversion matrix to convert the RGB signal into tristimulus values (X+X',Y+Y',Z+Z') in the second color gamut based on external light tristimulus values (X',Y',Z').

(5) A display device comprising:

a first translucent substrate;

a second translucent substrate facing the first translucent substrate;

a liquid crystal layer including polymer dispersed liquid crystal sealed between the first translucent substrate and the second translucent substrate;

at least one light emitter facing at least one of a side surface of the first translucent substrate or a side surface of the second translucent substrate;

a display controller including:

an external light analyzer configured to set, in accordance with a received signal of external light information, a second color gamut different from a first color gamut displayable when the external light is not present; and a signal adjuster configured to convert in color a first pixel input signal into a second pixel input signal that reduces a color shift of a second reproduced color reproduced in the second color gamut from a first reproduced color reproduced in the first color gamut in accordance with the first pixel input signal; and a first electrode and a second electrode interposing the liquid crystal layer therebetween, wherein the light emitter is configured to sequentially emit light of a first color, light of a second color, and light of a third color based on a light emitter control value using a field-sequential system, and the display controller is configured to:

compare a gradation value of the first color, a gradation value of the second color, and a gradation value of the third color in the first pixel input signal with a gradation value of the first color, a gradation value of the second color, and a gradation value of the third color in the second pixel input signal on a color-by-color basis, and calculate, based on a higher gradation value of each of the colors, a gradation value of the first color, a gradation value of the second color, and a gradation value of the third color for a third pixel input signal;

sequentially apply a voltage to the first electrode according to the gradation value of the first color, the gradation value of the second color, and the gradation value of the third color of the third pixel input signal; and set the light emitter control value for a color having the same gradation value as that of the first pixel input signal among the gradation value of the first color, the gradation value of the second color, and the gradation value of the third color of the third pixel input signal to a value lower than the light emitter control value for a color having the same gradation value as that of the second pixel input signal among the gradation value of the first color, the gradation value of the second color, and the gradation value of the third color of the third pixel input signal.

(6) The display device according to (5), wherein the light emitter control value is a light emission intensity.

(7) The display device according to (5), wherein the light emitter control value is a duty ratio of pulse width modulation.

(8) The display device according to any one of (1) to (7), wherein, when the second reproduced color is outside the second color gamut, the signal adjuster is configured to convert in color the first pixel input signal into the second pixel input signal such that the second reproduced color is reproducible at an outer border of the second color gamut.

(9) The display device according to any one of (1) to (8), further comprising an external light setter configured to receive the signal of the external light information, wherein the external light setter is a visible light sensor, and is configured to generate the signal of the external light information according to visible light of the external light detected by the external light setter.

(10) The display device according to any one of (1) to (8), further comprising an external light setter configured to receive the signal of the external light information, wherein the external light setter is a setting switch capable of changing a set value of the external light information set in advance according to visible light of the external light, and is configured to generate the signal of the external light information based on the set value of the external light information.

What is claimed is:

1. A display device comprising:

a first translucent substrate;

a second translucent substrate facing the first translucent substrate;

a liquid crystal layer including polymer dispersed liquid crystal sealed between the first translucent substrate and the second translucent substrate;

at least one light emitter facing at least one of a side surface of the first translucent substrate or a side surface of the second translucent substrate; and a drive circuit including:
an external light analyzer configured to set, in accordance with a received signal of external light information, a second color gamut different from a first color gamut displayable when external light is not present; and a signal adjuster configured to convert in color a first pixel input signal into a second pixel input signal that reduces a color shift of a second reproduced color reproduced in the second color gamut from a first reproduced color reproduced in the first color gamut in accordance with the first pixel input signal, wherein the first translucent substrate has a first principal surface and a second principal surface that is a plane parallel to the first principal surface, the second translucent substrate has a first principal surface and a second principal surface that is a plane parallel to the first principal surface, when the polymer dispersed liquid crystal is in a non-scattering state, a background on the first principal surface side of the second translucent substrate is visible from the first principal surface of the first translucent substrate, or a background on the first principal surface side of the first translucent substrate is visible from the first principal surface of the second translucent substrate, a region of the second color gamut is smaller than a region of the first color gamut displayable when the external light is not present, and the signal adjuster converts the first pixel input signal into the second pixel input signal by
performing gamma conversion on color values of the second pixel input signal,
performing color gamut conversion on the gamma-converted color values of the second pixel input signal to generate converted color values,
when a converted color value is smaller than 0 or greater than 1, performing out-of-gamut correction by correcting to 0 any converted color value smaller than 0 and by correcting to 1 any converted color value greater than 1, and
performing inverse gamma conversion on the converted color values to generate the second pixel input signal.

2. The display device according to claim 1, further comprising a first electrode and a second electrode interposing the liquid crystal layer therebetween, wherein the light emitter is configured to sequentially emit light of a first color, light of a second color, and light of a third color using a field-sequential system, and the drive circuit is configured to control the light emitter to emit the light of the first color, the light of the second color, and the light of the third color at a same light emission intensity, and applies a voltage to the first electrode according to a gradation value of each of the first color, the second color, and the third color in accordance with the second pixel input signal.

3. The display device according to claim 1, wherein the signal adjuster is configured to convert a first input color of the first pixel input signal into a second input color of the second pixel input signal using a third color conversion matrix obtained by multiplying a first color conversion matrix to convert a red-green-blue (RUB) signal in the first color gamut into tristimulus values (X,Y,Z) by an inverse matrix of a second conversion matrix to convert the RUB signal into tri stimulus values (X+X',Y+Y',Z+Z') in the second color gamut based on external light tri stimulus values (X',Y',Z').

4. A display device comprising:
a first translucent substrate;
a second translucent substrate facing the first translucent substrate;
a liquid crystal layer including polymer dispersed liquid crystal sealed between the first translucent substrate and the second translucent substrate;
at least one light emitter facing at least one of a side surface of the first translucent substrate or a side surface of the second translucent substrate;
a drive circuit including:
an external light analyzer configured to set, in accordance with a received signal of external light information, a second color gamut different from a first color gamut displayable when external light is not present; and
a signal adjuster configured to convert in color a first pixel input signal into a second pixel input signal that reduces a color shift of a second reproduced color reproduced in the second color gamut from a first reproduced color reproduced in the first color gamut in accordance with the first pixel input signal; and
a first electrode and a second electrode interposing the: liquid crystal layer therebetween, wherein
the light emitter is configured to sequentially emit light of a first color, light of a second color, and light of a third color based on a light emitter control value using a field-sequential system, the first to third colors being different from one another, and
the drive circuit is configured to:
compare a gradation value of the first color, a gradation value of the second color, and a gradation value of the third color for the first pixel input signal with a. gradation value of the first color, a gradation value of the second color, and a gradation value of the third color for the second pixel input signal on a color-by-color basis, and select higher gradation values of the first to third colors between the respective gradation values for the first pixel input signal and the respective gradation values for the second pixel input signal on the color-by-color basis to calculate, gradation values of the first to third colors for a third pixel input signal;
sequentially apply a voltage to the first electrode according to the gradation values for the third pixel input signal; and
set a corresponding light emitter control value for each color of the first to third colors of the third pixel input signal such that a light emitter control value set for any of the first to third colors having a gradation value selected from the first pixel input signal is lower than a light emitter control value set for any of the first to third colors having a gradation value selected from the second pixel input signal.

5. The display device according to claim 4, wherein each light emitter control value is a light emission intensity.

6. The display device according to claim 4, wherein each light emitter control value is a duty ratio of pulse width modulation.

7. The display device according to claim 1, wherein, when the converted color value is outside the second color gamut, the signal adjuster is configured to convert in color the first pixel input signal into the second pixel input signal to correct the converted color value to the second reproduced color located at an outer border of the second color gamut.

8. The display device according to claim 1, further comprising an external light setter configured to receive the signal of the external light information, wherein
the external light setter is a visible light sensor, and is configured to generate the signal of the external light information according to visible light of the external light detected by the external light setter.

9. The display device according to claim 1, further comprising an external light setter configured to receive the signal of the external light information, wherein
the external light setter is a setting switch capable of changing a set value of the external light information set in advance according to visible light of the external light, and is configured to generate the signal of the external light information based on the set value of the external light information.

10. The display device according to claim 4, wherein, when a converted color converted from the first reproduced color is outside the second color gamut, the signal adjuster is configured to convert in color the first pixel input signal into the second pixel input signal to correct the converted color to the second reproduced color located at an outer border of the second color gamut.

11. The display device according to claim 4, further comprising an external light setter configured to receive the signal of the external light information, wherein the external light setter is a visible light sensor, and is configured to generate the signal of the external light information according to visible light of the external light detected by the external light setter.

12. The display device according to claim 4, further comprising an external light setter configured to receive the signal of the external light information, wherein
the external light setter is a setting switch capable of changing a set value of the external light information set in advance according to visible light of the external light, and is configured to generate the signal of the external light information based on the set value of the external light information.

13. The display device according to claim 1, wherein
the color shift is a shift amount from the first reproduced color to the second reproduced color, and
the signal adjuster is configured to reduce the shift amount to be less than a shift amount from the first reproduced color to the converted color value before the out-of-gamut correction.

14. The display device according to claim 4, wherein
the color shift is a shift amount from the first reproduced color to the second reproduced color, and
the signal adjuster is configured to reduce the shift amount to be less than a shift amount from the first reproduced color to a converted color that is before out-of-gamut correction.

* * * * *